United States Patent
Nam et al.

(10) Patent No.: US 12,335,971 B2
(45) Date of Patent: Jun. 17, 2025

(54) MULTIPLE-SLOT PHYSICAL DOWNLINK CONTROL CHANNEL MONITORING

(71) Applicant: QUALCOMM Incorporated, San Diego, CA (US)

(72) Inventors: Wooseok Nam, San Diego, CA (US); Jing Sun, San Diego, CA (US); Jae Ho Ryu, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/932,790

(22) Filed: Sep. 16, 2022

(65) Prior Publication Data

US 2023/0164795 A1  May 25, 2023

Related U.S. Application Data

(60) Provisional application No. 63/264,349, filed on Nov. 19, 2021.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC . H04W 72/23; H04W 72/0446; H04W 72/04; H04L 5/0053; H04L 5/0005; H04L 5/005
See application file for complete search history.

(56) References Cited

U.S. PATENT DOCUMENTS

| | | | |
|---|---|---|---|
| 2017/0272895 A1* | 9/2017 | Park | H04W 8/186 |
| 2021/0314927 A1* | 10/2021 | Noh | H04L 5/0023 |
| 2023/0189305 A1* | 6/2023 | Oteri | H04W 72/51 370/329 |
| 2024/0260010 A1* | 8/2024 | Davydov | H04L 5/0053 |
| 2024/0396694 A1* | 11/2024 | Kuang | H04L 5/0023 |
| 2024/0430899 A1* | 12/2024 | Grant | H04L 5/0053 |

OTHER PUBLICATIONS

International Search Report and Written Opinion—PCT/US2022/077785—ISA/EPO—Jan. 4, 2023.

(Continued)

*Primary Examiner* — Mohamed A Kamara
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may determine that a UE-specific search space (USS) monitoring occasion and a common search space (CSS) monitoring occasion are to occur in a slot group. The UE may perform one or more search space monitoring actions based at least in part on determining that the USS monitoring occasion and the CSS monitoring occasion are to occur in the slot group. Numerous other aspects are described.

21 Claims, 15 Drawing Sheets

(56) References Cited

OTHER PUBLICATIONS

Qualcomm Incorporated: "PDCCH Monitoring Enhancements", 3GPP TSG-RAN WG1 #106bis-e, R1-2110173, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, pp. 1-10, XP052059109, Paragraph 2.1.5, Figure 4.

Qualcomm Incorporated: "PDCCH Monitoring Enhancements", 3GPP TSG-RAN WG1 #107-e, R1-2112204, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, pp. 1-8, XP052075310, Paragraph [2.1.3], Figures 1a, 1b,1c.

* cited by examiner

MULTIPLE-SLOT PHYSICAL DOWNLINK CONTROL CHANNEL MONITORING

CROSS-REFERENCE TO RELATED APPLICATION

This Patent Application claims priority to U.S. Provisional Patent Application No. 63/264,349, filed on Nov. 19, 2021, entitled "MULTIPLE-SLOT PHYSICAL DOWNLINK CONTROL CHANNEL MONITORING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multiple-slot physical downlink control channel (PDCCH) monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to determine that a UE-specific search space (USS) monitoring occasion and a common search space (CSS) monitoring occasion are to occur in a slot group. The one or more processors may be configured to refrain from monitoring the USS monitoring occasion based at least in part on determining that the USS monitoring occasion and the CSS monitoring occasion are to occur in the slot group.

Some aspects described herein relate to a UE for wireless communication. The user equipment may include a memory and one or more processors coupled to the memory. The one or more processors may be configured to determine that a USS monitoring occasion and a CSS monitoring occasion are to occur in a slot group. The one or more processors may be configured to refrain from monitoring a unicast PDCCH portion of the CSS monitoring occasion based at least in part on determining that the USS monitoring occasion and the CSS monitoring occasion are to occur in the slot group.

Some aspects described herein relate to a UE for wireless communication. The user equipment may include a memory and one or more processors coupled to the memory. The one or more processors may be configured to determine that a USS monitoring occasion is to occur in a first slot within a slot group. The one or more processors may be configured to determine that a CSS monitoring occasion is to occur in a second slot within the slot group. The one or more processors may be configured to determine that the first slot and the second slot are different slots. The one or more processors may be configured to monitor the USS monitoring occasion in the second slot based at least in part on determining that the first slot and the second slot are different slots.

Some aspects described herein relate to a base station for wireless communication. The base station may include a memory and one or more processors coupled to the memory. The one or more processors may be configured to configure a USS and CSS monitoring configuration for monitoring USS monitoring occasions and CSS monitoring occasions within a slot group. The one or more processors may be configured to transmit the USS and CSS monitoring configuration to a UE.

Some aspects described herein relate to a method of wireless communication performed by a UE. The method may include determining that a USS monitoring occasion and a CSS monitoring occasion are to occur in a slot group. The method may include refraining from monitoring the USS monitoring occasion based at least in part on determining that the USS monitoring occasion and the CSS monitoring occasion are to occur in the slot group.

Some aspects described herein relate to a method of wireless communication performed by a UE. The method may include determining that a USS monitoring occasion and a CSS monitoring occasion are to occur in a slot group. The method may include refraining from monitoring a unicast PDCCH portion of the CSS monitoring occasion based at least in part on determining that the USS monitoring occasion and the CSS monitoring occasion are to occur in the slot group.

Some aspects described herein relate to a method of wireless communication performed by a UE. The method may include determining that a USS monitoring occasion is to occur in a first slot within a slot group. The method may include determining that a CSS monitoring occasion is to occur in a second slot within the slot group. The method may include determining that the first slot and the second slot are different slots. The method may include monitoring the USS monitoring occasion in the second slot based at least in part on determining that the first slot and the second slot are different slots.

Some aspects described herein relate to a method of wireless communication performed by a base station. The method may include configuring a USS and CSS monitoring configuration for monitoring USS monitoring occasions and CSS monitoring occasions within a slot group. The method may include transmitting the USS and CSS monitoring configuration to a UE.

Some aspects described herein relate to a non-transitory computer-readable medium that stores a set of instructions for wireless communication by a UE. The set of instructions, when executed by one or more processors of the UE, may cause the UE to determine that a USS monitoring occasion and a CSS monitoring occasion are to occur in a slot group. The set of instructions, when executed by one or more processors of the UE, may cause the UE to refrain from monitoring the USS monitoring occasion based at least in part on determining that the USS monitoring occasion and the CSS monitoring occasion are to occur in the slot group.

Some aspects described herein relate to a non-transitory computer-readable medium that stores a set of instructions for wireless communication by a UE. The set of instructions, when executed by one or more processors of the UE, may cause the UE to determine that a USS monitoring occasion and a CSS monitoring occasion are to occur in a slot group. The set of instructions, when executed by one or more processors of the UE, may cause the UE to refrain from monitoring a unicast PDCCH portion of the CSS monitoring occasion based at least in part on determining that the USS monitoring occasion and the CSS monitoring occasion are to occur in the slot group.

Some aspects described herein relate to a non-transitory computer-readable medium that stores a set of instructions for wireless communication by a UE. The set of instructions, when executed by one or more processors of the UE, may cause the UE to determine that a USS monitoring occasion is to occur in a first slot within a slot group. The set of instructions, when executed by one or more processors of the UE, may cause the UE to determine that a CSS monitoring occasion is to occur in a second slot within the slot group. The set of instructions, when executed by one or more processors of the UE, may cause the UE to determine that the first slot and the second slot are different slots. The set of instructions, when executed by one or more processors of the UE, may cause the UE to monitor the USS monitoring occasion in the second slot based at least in part on determining that the first slot and the second slot are different slots.

Some aspects described herein relate to a non-transitory computer-readable medium that stores a set of instructions for wireless communication by a base station. The set of instructions, when executed by one or more processors of the base station, may cause the base station to configure a USS and CSS monitoring configuration for monitoring USS monitoring occasions and CSS monitoring occasions within a slot group. The set of instructions, when executed by one or more processors of the base station, may cause the base station to transmit the USS and CSS monitoring configuration to a UE.

Some aspects described herein relate to an apparatus for wireless communication. The apparatus may include means for determining that a USS monitoring occasion and a CSS monitoring occasion are to occur in a slot group. The apparatus may include means for refraining from monitoring the USS monitoring occasion based at least in part on determining that the USS monitoring occasion and the CSS monitoring occasion are to occur in the slot group.

Some aspects described herein relate to an apparatus for wireless communication. The apparatus may include means for determining that a USS monitoring occasion and a CSS monitoring occasion are to occur in a slot group. The apparatus may include means for refraining from monitoring a unicast PDCCH portion of the CSS monitoring occasion based at least in part on determining that the USS monitoring occasion and the CSS monitoring occasion are to occur in the slot group.

Some aspects described herein relate to an apparatus for wireless communication. The apparatus may include means for determining that a USS monitoring occasion is to occur in a first slot within a slot group. The apparatus may include means for determining that a CSS monitoring occasion is to occur in a second slot within the slot group. The apparatus may include means for determining that the first slot and the second slot are different slots. The apparatus may include means for monitoring the USS monitoring occasion in the second slot based at least in part on determining that the first slot and the second slot are different slots.

Some aspects described herein relate to an apparatus for wireless communication. The apparatus may include means for configuring a USS and CSS monitoring configuration for monitoring USS monitoring occasions and CSS monitoring occasions within a slot group. The apparatus may include means for transmitting the USS and CSS monitoring configuration to a UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
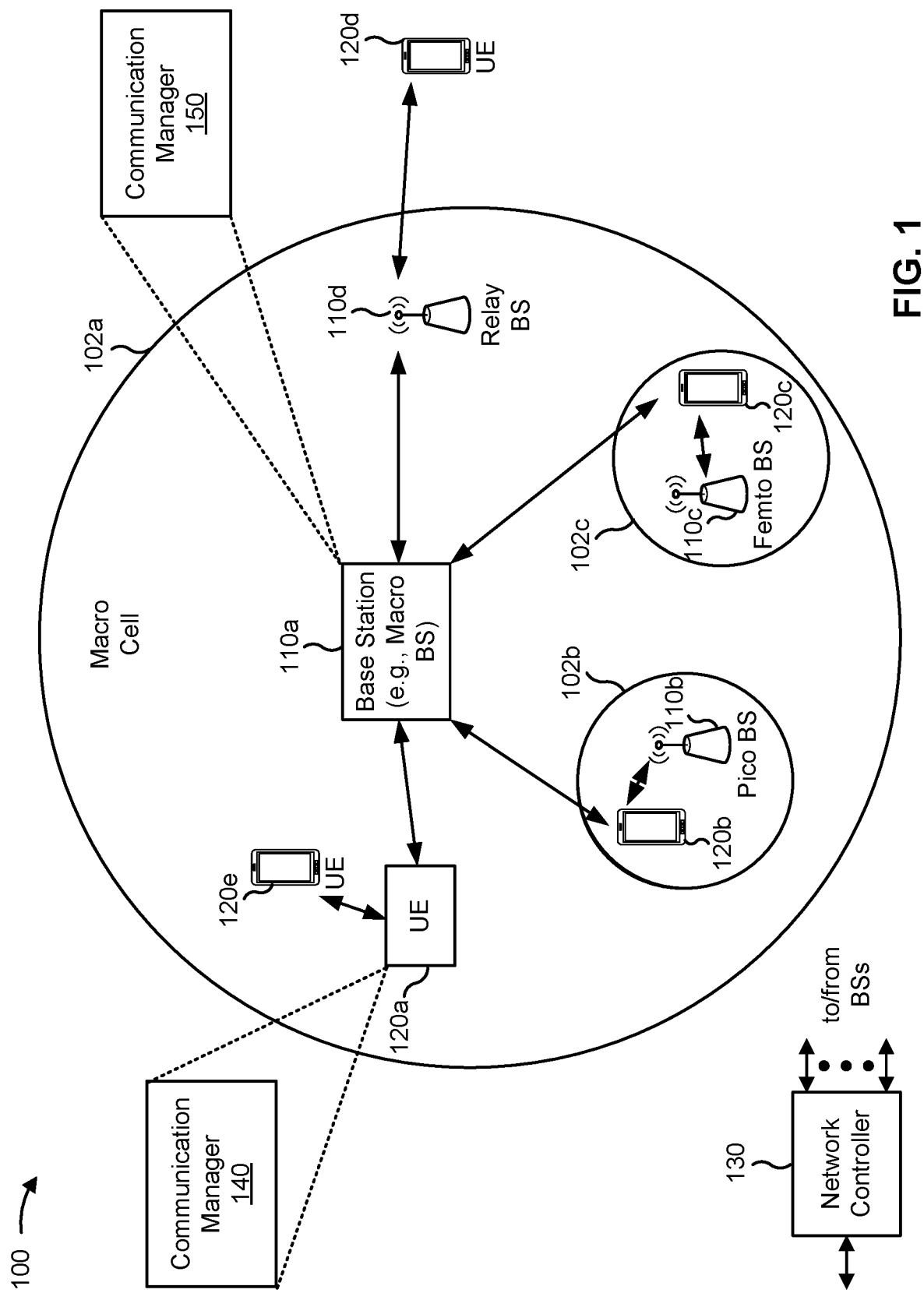
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine that a UE-specific search space (USS) monitoring occasion and a common search space (CSS) monitoring occasion are to occur in a slot group; and refrain from monitoring the USS monitoring occasion based at least in part on determining that the USS monitoring occasion and the CSS monitoring occasion are to occur in the slot group. Additionally, or alternatively, the communication manager 140 may perform one or more other operations described herein.

In some aspects, the UE 120 may include a communication manager 140. As described in more detail elsewhere herein, the communication manager 140 may determine that a USS monitoring occasion and a CSS monitoring occasion are to occur in a slot group; and refrain from monitoring a unicast physical downlink control channel (PDCCH) portion of the CSS monitoring occasion based at least in part on determining that the USS monitoring occasion and the CSS monitoring occasion are to occur in the slot group. Additionally, or alternatively, the communication manager 140 may perform one or more other operations described herein.

In some aspects, the UE 120 may include a communication manager 140. As described in more detail elsewhere herein, the communication manager 140 may determine that a USS monitoring occasion is to occur in a first slot within a slot group; determine that a CSS monitoring occasion is to occur in a second slot within the slot group; determine that the first slot and the second slot are different slots; and monitor the USS monitoring occasion in the second slot based at least in part on determining that the first slot and the second slot are different slots. Additionally, or alternatively, the communication manager 140 may perform one or more other operations described herein.

In some aspects, the base station 110 may include a communication manager 150. As described in more detail elsewhere herein, the communication manager 150 may configure a USS and CSS monitoring configuration for monitoring USS monitoring occasions and CSS monitoring occasions within a slot group; and transmit the USS and CSS monitoring configuration to a UE. Additionally, or alternatively, the communication manager 150 may perform one or more other operations described herein.

As indicated above, FIG. 1 is provided as an example. Other examples may differ from what is described with regard to FIG. 1.

Figure 2:
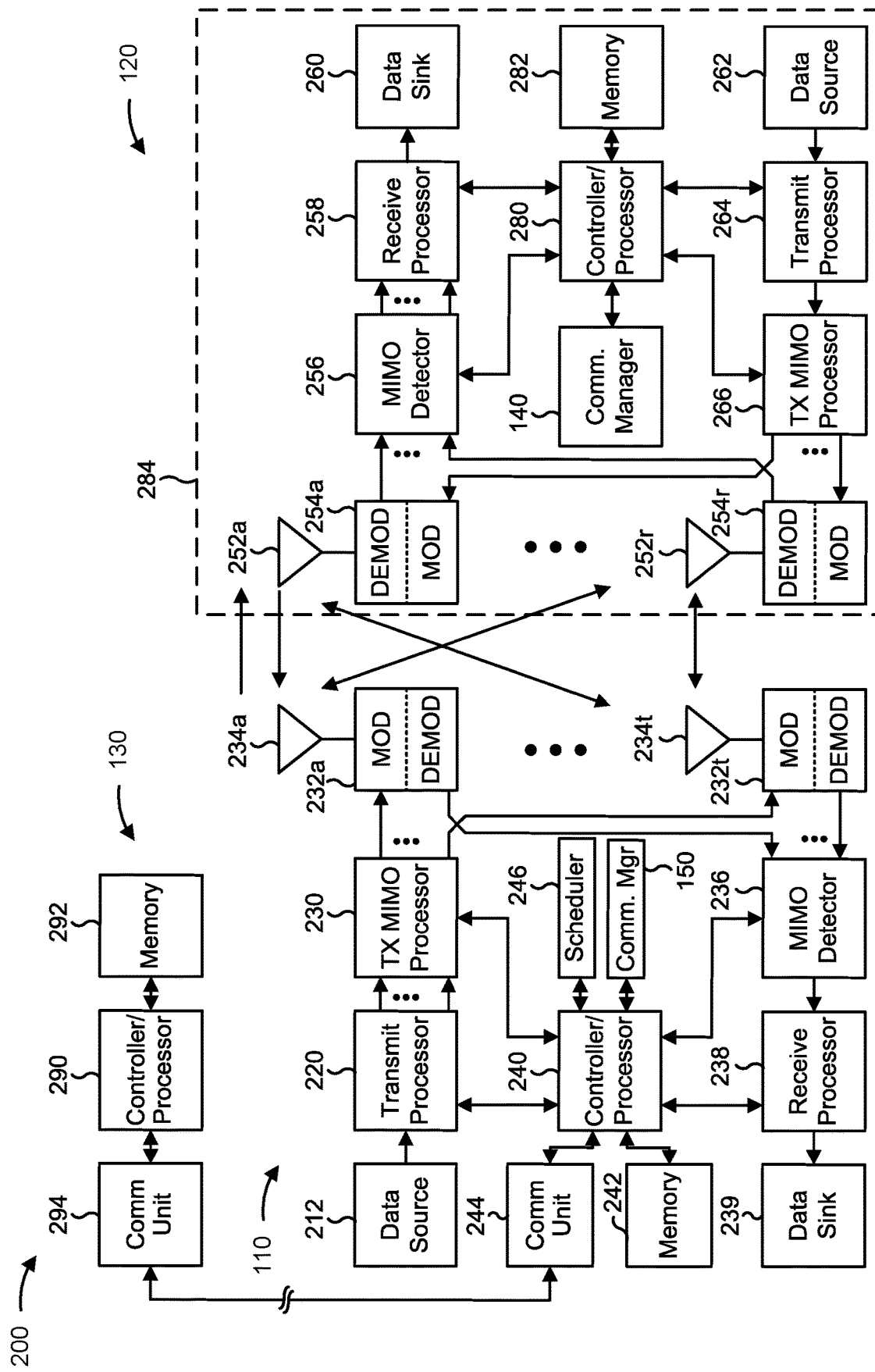
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A-13).

The controller/processor 240 of the base station 110, the controller/processor 280 of the UE 120, and/or any other component(s) of FIG. 2 may perform one or more techniques associated with multiple-slot (multi-slot) PDCCH monitoring, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for determining that a USS monitoring occasion and a CSS monitoring occasion are to occur in a slot group; and/or means for refraining from monitoring the USS monitoring occasion based at least in part on determining that the USS monitoring occasion and the CSS monitoring occasion are to occur in the slot group. The means for the UE 120 to perform operations described herein may include, for example, one or more communication manager 140, antenna 252, modem 254, MIMO detector 256, receive processor 258, transmit processor 264, TX MIMO processor 266, controller/processor 280, or memory 282.

In some aspects, the UE 120 includes means for determining that a USS monitoring occasion and a CSS monitoring occasion are to occur in a slot group; and/or means for refraining from monitoring a unicast PDCCH portion of the CSS monitoring occasion based at least in part on determining that the USS monitoring occasion and the CSS monitoring occasion are to occur in the slot group. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for determining that a USS monitoring occasion is to occur in a first slot within a slot group; means for determining that a CSS monitoring occasion is to occur in a second slot within the slot group; means for determining that the first slot and the second slot are different slots; and/or means for monitoring the USS monitoring occasion in the second slot based at least in part on determining that the first slot and the second slot are different slots. The means for UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for configuring a USS and common search space CSS monitoring configuration for monitoring USS monitoring occasions and CSS monitoring occasions within a slot group; and/or means for transmitting the USS and CSS monitoring configuration to a UE 120. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In some cases, a base station 110 may broadcast a synchronization signal block (SSB), which may include a PSS and an SSS centralized within a physical broadcast channel (PBCH). Accordingly, the SSB may also be referred to as an SS/PBCH block.

Accordingly, a UE 120 may detect the PSS and/or the SSS to determine a physical cell identifier (PCID) associated with the base station 110 and a timing associated with the PBCH. Accordingly, the UE 120 may decode the PBCH to obtain a master information block (MIB) message. The MIB message may include frequency and timing information to allow the UE 120 to establish a radio resource control (RRC) connection with a cell including the base station 110, as well as including information for scheduling reception of remaining minimum system information (RMSI) by the UE 120. For example, the MIB message may include a pdcch-ConfigSIB1 data structure (e.g., as defined in 3GPP specifications and/or another standard) and/or another similar data structure defining a search space (e.g., in a PDCCH and/or the like) in which the UE 120 may receive scheduling information for the RMSI. This search space may be referred to as a Type0-PDCCH CSS. In general, a CSS is a type of search space that is monitored (or configured to be monitored) by a plurality of UEs 120 for MIBs, SIBs, and/or other types of information that is relevant for a plurality of UEs 120.

In some cases, the MIB message may include information associated with a control resource set (CORESET) configuration defining physical resources (e.g., one or more frequency resources, one or more time resources, and/or other resources) for monitoring the Type0-PDCCH CSS. Accordingly, this CORESET may be referred to as a Type0-PDCCH CORESET.

For other CSSs (e.g., a Type0A-PDCCH CSS associated with additional SIB messages, a Type1-PDCCH CSS associated with a random access response (RAR), and/or a Type2-PDCCH CSS associated with a paging occasion (PO)), the base station 110 may instruct the UE 120 to monitor a similar set of monitoring occasions that includes monitoring occasions in consecutive slots (e.g., by setting a SearchSpaceId for searchSpaceOtherSystemInformation, ra-SearchSpace, and/or pagingSearchSpace in PDCCH-ConfigCommon, as defined in 3GPP specifications and/or another standard, to zero). These other CSSs may similarly be associated with corresponding CORESET configurations defining physical resources for monitoring the CSSs (e.g., a Type0A-PDCCH CSS, a Type1-PDCCH CSS, and/or a Type2-PDCCH CSS, as described above). Accordingly, these corresponding CORESETs may be referred to as a Type0A-PDCCH CORESET, a Type1-PDCCH CORESET, or a Type2-PDCCH CORESET, respectively.

The base station 110 may also broadcast and/or multicast other types of broadcast PDCCH information that is to be monitored in one or more CSS monitoring occasions. For example, the base station may broadcast and/or multicast downlink control information (DCI) for a plurality of UEs 120 to monitor in a CSS monitoring occasion, where the DCI is scrambled and/or is associated with one or more types of common radio network temporary identifiers (RNTIs). The one or more types of common RNTIs may include, for example, a system information RNTI (SI-RNTI—an RNTI for broadcast/multicasting system information), a random access RNTI (RA-RNTI—an RNTI that is used to address RARs to a plurality of UEs 120), a message B RNTI (MsgB-RNTI—an RNTI for reception of message B communications in a random access channel (RACH) procedure), and/or a paging RNTI (P-RNTI—an RNTI that is used for reception of paging), among other examples.

In some cases, the base station 110 may unicast UE-specific information to a particular UE 120. For example, a base station may unicast PDCCH information in DCI that is "piggybacked" or transmitted in a CSS monitoring occasion with broadcast/multicast information. The UE 120 may monitor the unicast PDCCH portion of the CSS monitoring occasion for the UE-specific information directed to the UE 120. The unicast PDCCH portion may be scrambled and/or may be associated with a UE-specific RNTI. Examples of UE-specific RNTIs include a cell RNTI (C-RNTI—an RNTI used as a unique identifier for RRC connection and scheduling for a particular UE 120), a modulation coding scheme cell RNTI (MCS-C-RNTI—an RNTI for dynamically scheduled unicast transmission), a configured scheduling RNTI (CS-RNTI—an RNTI for configured scheduled unicast transmission, activation, and/or deactivation), a sidelink RNTI (SL-RNTI—an RNTI for sidelink communication), a sidelink configured scheduling RNTI (SL-CS-RNTI—and RNTI for configured scheduled sidelink transmission), and/or a sidelink LTE configured scheduling RNTI (SL-L-CS-RNTI—an RNTI for configured scheduling of an LTE sidelink communication), among other examples.

Additionally and/or alternatively, the base station 110 may be unicast UE-specific information during a USS monitoring occasion. A USS monitoring occasion is a monitoring occasion that is configured to be monitored by a particular UE 120.

Figure 3A:
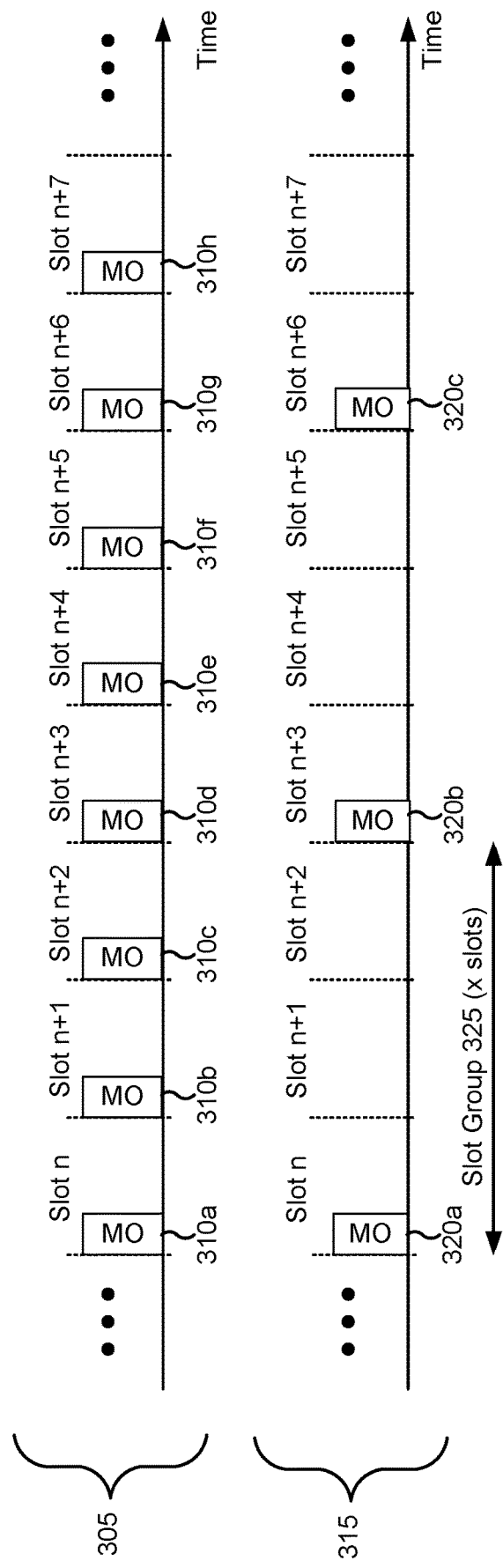
FIGS. 3A-3C are diagrams illustrating examples of search space monitoring techniques, in accordance with the present disclosure.
Figure 3B:
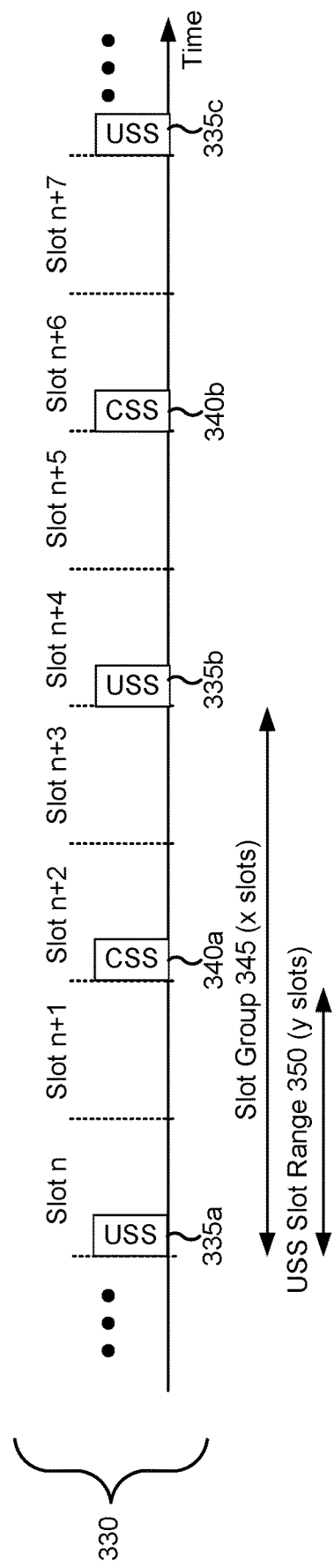
Figure 3C:
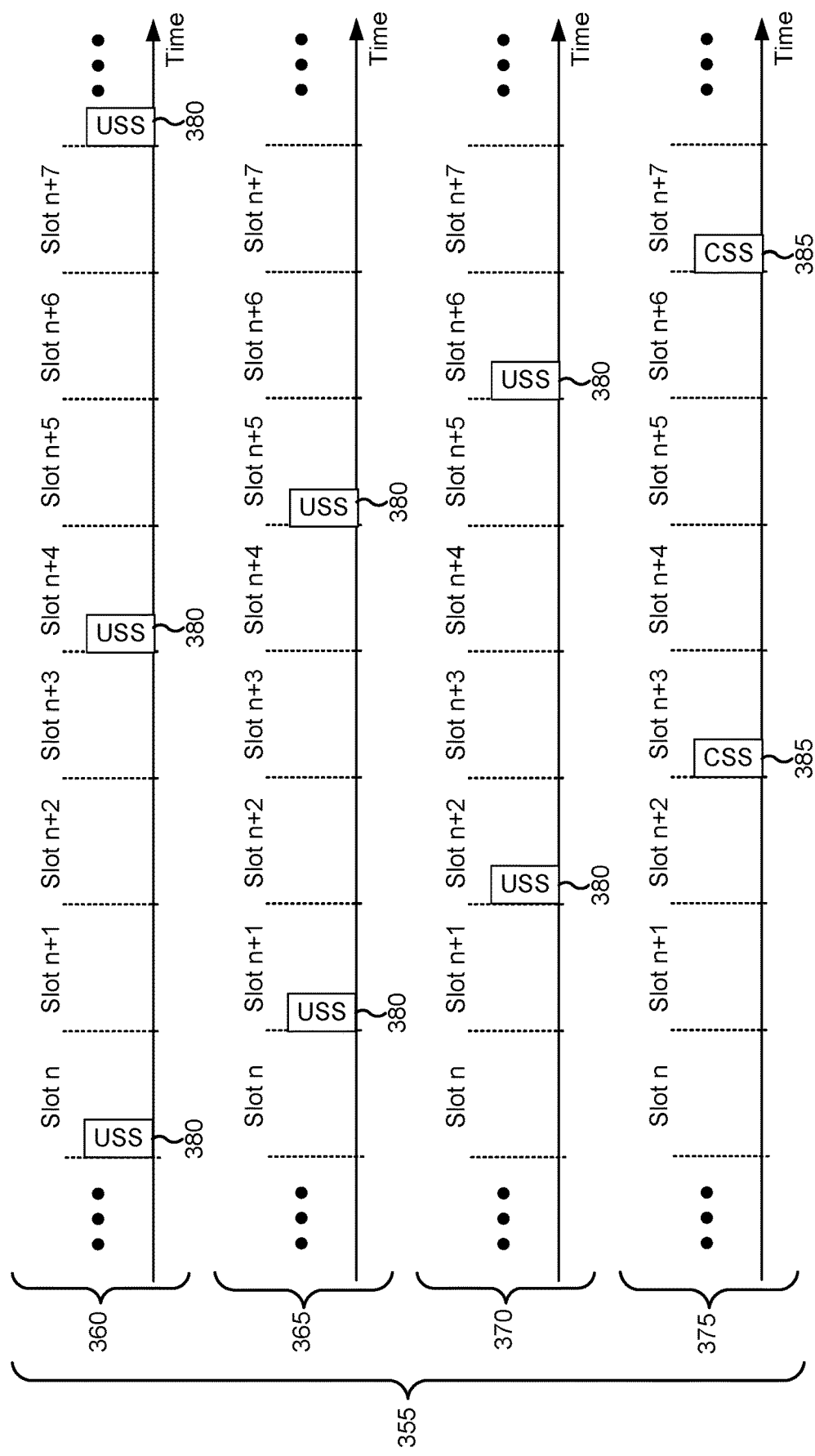

FIGS. 3A-3C are diagrams illustrating examples of search space monitoring techniques, in accordance with the present disclosure. In particular, FIGS. 3A and 3B illustrate examples of search space monitoring techniques for monitoring CSSs and/or USSs.

As shown in FIG. 3A, an example 305 of a search space monitoring technique includes a slot-based PDCCH search space monitoring technique. A UE 120 may monitor a plurality of monitoring occasions 310a-310h that are consecutive across a plurality of slots. As used herein, "slot" may refer to a portion of a subframe, which in turn may be a fraction of a radio frame within an LTE, 5G, or other wireless communication structure. In some aspects, a slot may include one or more symbols. Additionally, "symbol" may refer to an OFDM symbol or another similar symbol within a slot. The monitoring occasions 310a-310h may be associated with a CSS. Accordingly, the monitoring occasions 310a-310h may be referred to as a set of CSS monitoring occasions. While FIG. 3A illustrates a particular quantity of monitoring occasions 310a-310h, other quantities of monitoring occasions 310 are within the scope of the present disclosure.

In the example 305, a monitoring occasion 310a is included in slot n, where n represents an integer. Although shown at the beginning of slot n, the monitoring occasion 310a may be configured to include one or more symbols anywhere within slot n. A monitoring occasion 310b is included in slot n+1. The consecutive monitoring occasions 310a-310h may repeat in time. In the example 305, this repetition is in every slot such that the monitoring occasion 310c is in slot n+2 and the monitoring occasion 310d is in slot n+3, the monitoring occasion 310e is in slot n+4 and the monitoring occasion 310f is in slot n+5, and the monitoring occasion 310g is in slot n+6 and the monitoring occasion 310h is in slot n+7, and so on.

In higher frequencies (e.g., between 52.6 GHz and 114.25 GHz, an FR4 frequency, an FR4-a frequency, an FR4-1 frequency, and/or an FR5 frequency), phase noise may increase. Accordingly, to reduce the impact of phase noise, a wireless network may employ larger subcarrier spacings (SCSs). As used herein, "subcarrier spacing" or "SCS" may refer to a range of frequencies (or an amount of bandwidth) between subcarriers used on a cell of the wireless network. For example, a cell configured for FR2 may use an SCS between 60 kHz and 120 kHz while a cell configured for higher frequencies may use an SCS between 240 kHz and 1.92 MHz. Larger SCS results in slots with shorter length. For example, a slot in FR2 with 120 kHz SCS may be approximately 125 μs in length while a slot in higher frequencies with 960 kHz SCS may be approximately 15.6 μs in length.

Accordingly, as further shown in FIG. 3A, because the slot is shorter in duration, an example 315 of a search space monitoring technique includes a multiple-slot (multi-slot) PDCCH search space monitoring technique. In the example 315, the UE 120 may monitor a set monitoring occasions that are non-consecutive across slots. The set monitoring occasions may be associated with a CSS. The monitoring occasions include a monitoring occasion 320a in slot n, where n represents an integer. Although shown at the beginning of slot n, the monitoring occasion 320a may be configured to include one or more symbols anywhere within slot n. The set 315 includes MOs that are non-consecutive across slots. Accordingly, in the set 315, MO 320b is in slot n+3, MO 320c is in slot n+6, and so on. Although the non-consecutive MOs repeat every third slot in example 300, the consecutive MOs may repeat in every other slot (e.g., with MO 320b in slot n+2 and MO 320c in slot n+4, and so on), in every fourth slot (e.g., with MO 320b in slot n+4 and MO 320c in slot n+8, and so on), or according to larger periods.

As further shown in FIG. 3A, search space monitoring in the multi-slot PDCCH search space monitoring technique of the example 315 may be based at least in part on slots in a slot group 325. A slot group 325 consists of x (plurality) consecutive slots. A subframe may include a plurality of consecutive and non-overlapping slot groups 325. The start of the first slot group 325 in a subframe may be aligned with a subframe boundary of the subframe. The start of each slot group 325 in the subframe may be aligned with a slot boundary in the subframe.

As described above, a base station 110 may unicast UE-specific information during a USS monitoring occasion. As shown in FIG. 3B, an example 330 of a search space monitoring technique includes a multi-slot PDCCH search space monitoring technique in which a UE 120 is configured to monitor USS monitoring occasions 335a-335c and CSS monitoring occasions 340a, 340b. While FIG. 3B illustrates a particular quantities of USS monitoring occasions 335 and CSS monitoring occasions 340, other quantities of USS monitoring occasions 335 and CSS monitoring occasions 340 are within the scope of the present disclosure.

As further shown in FIG. 3B, search space monitoring in the multi-slot PDCCH search space monitoring technique of the example 330 may be based at least in part on slots in a slot group 345. A slot group 345 consists of x (plurality) consecutive slots. A subframe may include a plurality of consecutive and non-overlapping slot groups 345. The start of the first slot group 345 in a subframe may be aligned with a subframe boundary of the subframe. The start of each slot group 345 in the subframe may be aligned with a slot boundary in the subframe.

For monitoring occasions within a slot group 345, USS monitoring occasions 335 may be configured within a USS slot range 350 in the slot group 345. A USS slot range 350 consists of y (one or more) consecutive slots in the slot group 345. While one USS slot range 350 may be configured in a slot group 345, a USS slot range 350 may include a plurality of USS monitoring occasions 335. The location of the USS slot range 350 for a UE 120 may be located in the same slot(s) across a plurality of slot groups 345. However, the location of USS slot ranges 350 may be different for different UEs 120. Moreover, the USS slot range 350 in a slot group 345 may be used for CSS monitoring occasions with a dedicated RRC configuration for Type 1/3.

The quantity of x consecutive slots in a slot group 345 and the quantity of y consecutive slots in a USS slot range 350 may be configurable for a UE 120. For example, a base station 110 may configure the quantity of x consecutive slots in a slot group 345 and the quantity of y consecutive slots in a USS slot range 350 may be configured based at least in part on a UE capability for a UE 120. The UE 120 may transmit an indication of the UE capability to the base station 110, and the base station 110 may configure the quantity of x consecutive slots in a slot group 345 and the quantity of y consecutive slots in a USS slot range 350 based at least in part on receiving the indication of the UE capability. The UE capability may include, for example, a capability to monitor and/or decode communications at a particular rate or within a particular decoding time duration, or another type of UE capability, FIG. 3C illustrates an example 355 of a multi-slot PDCCH search space monitoring technique in which a base station 110 configures a plurality of UEs 120 with different USS monitoring occasion configurations. For example, a first UE 120 may be configured with a USS monitoring occasion configuration 360, a second UE 120 may be configured with a USS monitoring occasion configuration 365, a third UE 120 may be configured with a USS monitoring occasion configuration 370, and so on. Moreover, the base station 110 may configure the plurality of UEs 120 with a CSS monitoring configuration 375. The USS monitoring configurations 360-370 may schedule or configure USS monitoring occasions 380 for the plurality of UEs 120, and the CSS monitoring configuration 375 may configure CSS monitoring occasions 385 for the plurality of UEs 120.

In some cases, the CSS monitoring occasions 385 configured for one or more UEs 120 may be configured to be sparser (e.g., occur less frequently) relative to the USS monitoring occasions 380 configured for the one or more UEs 120. For example, the USS monitoring occasions 380 may be configured to occur in every slot group for a UE 120, whereas CSS monitoring occasions 385 may be configured to occur one every 20 milliseconds. However, other periodicities for the USS monitoring occasions 380 and the CSS monitoring occasions 385 are within the scope of the present disclosure.

The staggering of the USS monitoring occasions 380 for the UEs 120 provided by the USS monitoring occasions 360-370 results in USS monitoring occasions for the plurality of UEs 120 being staggered in the time domain. This enables the base station 110 to reduce and/or minimize congestion on the control channels transmitted by the base station 110 to the plurality of UEs 120.

As indicated above, FIGS. 3A-3C is provided as an example. Other examples may differ from what is described with respect to FIGS. 3A-3C.

In some cases, a base station may have to schedule one or more USS monitoring occasions closer in time to one or more CSS monitoring occasions for one or more UEs. For example, staggering USS monitoring occasions for a plurality of UEs to reduce control channel congestion, as described above in FIG. 3C, may result in one or more USS monitoring occasions occurring in one or more slots adjacent to (or within one slot of) one or more slots in which one or more CSS monitoring occasions occur for one or more UEs. Accordingly, a UE that is configured to monitor and decode a USS monitoring occasion close in the time domain to a CSS monitoring occasion may consume larger amounts of power because the UE is given fewer opportunities to transition to a sleep mode for a sleep duration or a micro-sleep duration. Even worse, the UE may lack sufficient processing capability such that signals transmitted within one of the CSS or the USS are not received and/or not decoded. This wastes spectrum and network overhead, as well as power and processing resources, because the base station will generally re-transmit, at a future time, the signals that were not received and/or not decoded.

Some techniques and apparatuses described herein enable a UE (e.g., UE 120) to handle USS monitoring occasions and CSS monitoring occasions that occur in a slot group (e.g., a same slot group). For example, a UE may be configured to refrain from monitoring a USS monitoring occasion in slot group in which a CSS monitoring occasion also occurs. As another example, a UE may be configured to refrain from monitoring a unicast PDCCH portion of a CSS monitoring occasion that occurs in a slot group with a USS monitoring occasion. As another example, a UE may be configured to shift the location of USS monitoring occasions for the UE based at least in part on a USS monitoring occasion for the UE and a CSS monitoring occurring in a slot group. These techniques and other techniques described herein enable a UE to conserve power and processing resources by providing the UE with more opportunities to transition to a sleep mode for a sleep duration or a micro-sleep duration. Additionally, in some aspects, the UE prevents the wasting of spectrum and other network resources when the UE lacks sufficient processing power to monitor, and decode signals within, both the USS and the CSS.

Figure 4:
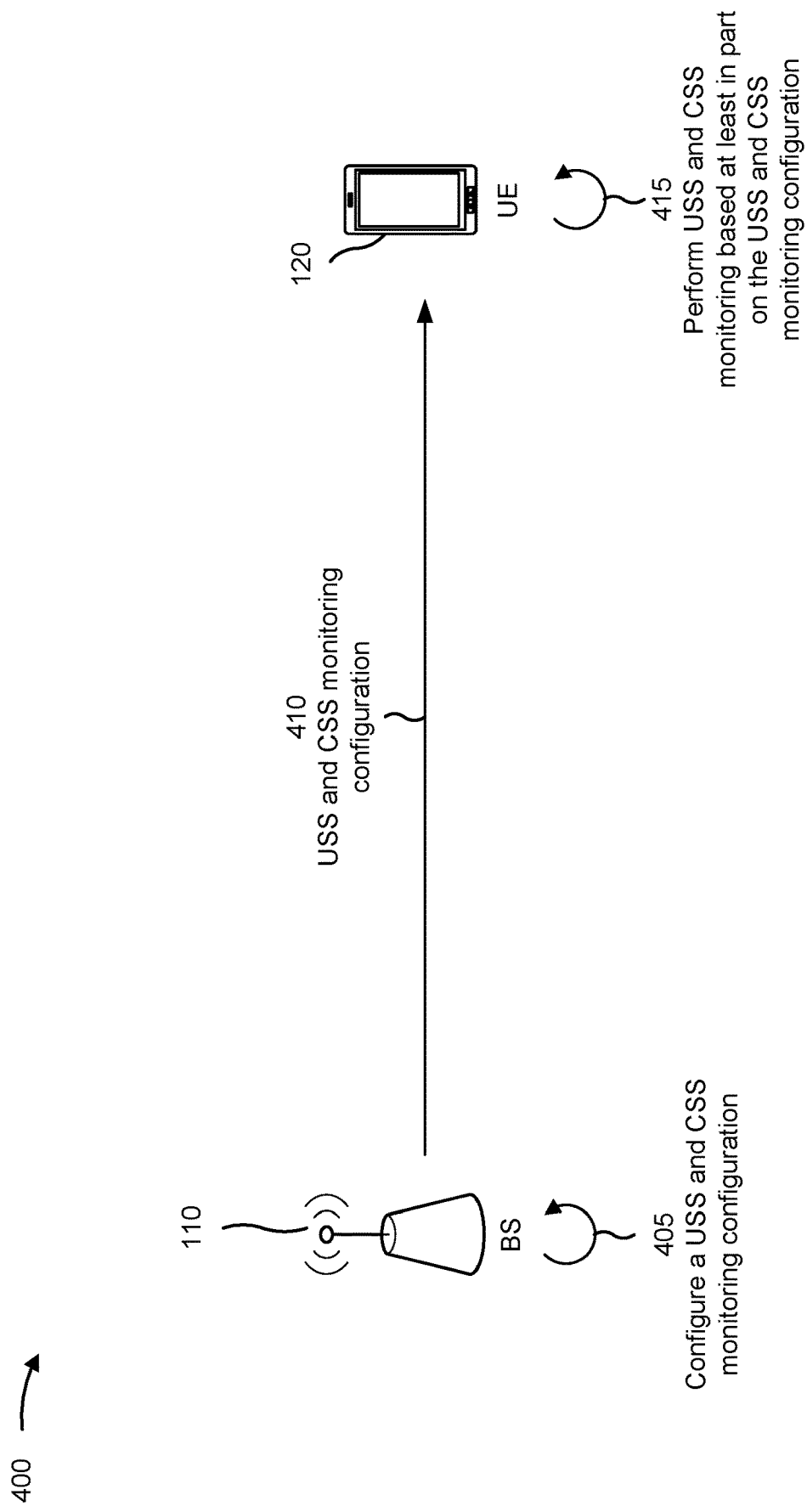
FIGS. 4-7 are diagrams illustrating examples associated with multiple-slot (multi-slot) physical downlink control channel (PDCCH) monitoring, in accordance with the present disclosure.

FIG. 4 is a diagram illustrating an example 400 of configuration of multi-slot PDCCH monitoring, in accordance with the present disclosure. Example 400 includes a base station 110 and a UE 120. The base station 110 and the UE 120 may communicate on an access link, which may include a downlink and an uplink. The base station 110 may transmit downlink communications to the UE 120 on the downlink. The downlink communications may include control channel communications (e.g., PDCCH communications), shared channel communications (e.g., physical downlink shared channel (PDSCH) communications), and/or other types of communications. The UE 120 may monitor for downlink communications (e.g., PDCCH communications) from the base station 110 in one or more types of monitoring occasions, including USS monitoring occasions and CSS monitoring occasions.

As shown in FIG. 4, and by reference number 405, the base station 110 may configure a USS and CSS monitoring configuration for the UE 120. In some aspects, the base station 110 configures USS and CSS monitoring configurations for a plurality of UEs 120. The USS and CSS monitoring configuration may include one or more parameters, rules, and/or other types of information for the UE 120 to perform USS monitoring occasion monitoring and CSS monitoring occasion monitoring.

In some aspects, the base station 110 configures the USS and CSS monitoring configuration for the UE 120 based at least in part on a UE capability associated with the UE 120. In some aspects, the base station 110 configures the USS and CSS monitoring configuration for the UE 120 based at least in part on one or more other parameters and/or factors such as UE assistance information transmitted from the UE 120 (and received by the base station 110). The UE 120 may transmit an indication of the UE capability to the base station 110, and the base station 110 may configure the USS and CSS monitoring configuration based at least in part on receiving the indication of the UE capability from the UE 120.

The USS and CSS monitoring configuration may include one or more parameters for monitoring USS monitoring occasions and CSS monitoring occasions. For example, the one or more parameters may indicate how the UE 120 is to handle particular scenarios in which a USS monitoring occasion and a CSS monitoring occasion are included in a slot group (e.g., a same slot group). Accordingly, the one or more parameters may indicate how the UE 120 is to modify the UE 120's monitoring behavior in scenarios in which a USS monitoring occasion and a CSS monitoring occasion are included in a slot group.

For example, the USS and CSS monitoring configuration may indicate that the UE 120 is to ignore or refrain from monitoring a USS monitoring occasion that occurs in a slot group with a CSS monitoring occasion. As another example, the USS and CSS monitoring configuration may indicate that the UE 120 is to monitor a USS monitoring occasion that occurs in a slot group with a CSS monitoring occasion, and to refrain from monitoring a unicast PDCCH portion of the CSS monitoring occasion. As another example, the USS and CSS monitoring configuration may indicate that the UE 120 is to shift or modify the slot location of USS monitoring occasions to align with a CSS monitoring occasion in a slot group. Otherwise, the UE 120 may monitor USS monitoring occasions and CSS monitoring occasions as configured (e.g., without any modification of monitoring behavior) where either a USS monitoring occasion or a CSS monitoring occasion (but not both) are in a slot group. The UE capability, provided by the UE 120 to the base station 110, may indicate a capability to support one or more of these monitoring techniques.

As further shown in FIG. 4, and by reference number 410, the base station 110 may transmit (and the UE 120 may receive) the USS and CSS monitoring configuration. The base station 110 may transmit the USS and CSS monitoring configuration in a downlink communication, such as a DCI communication, an RRC communication, a medium access control control element (MAC-CE) communication, and/or another type of downlink communication.

Figure 5:
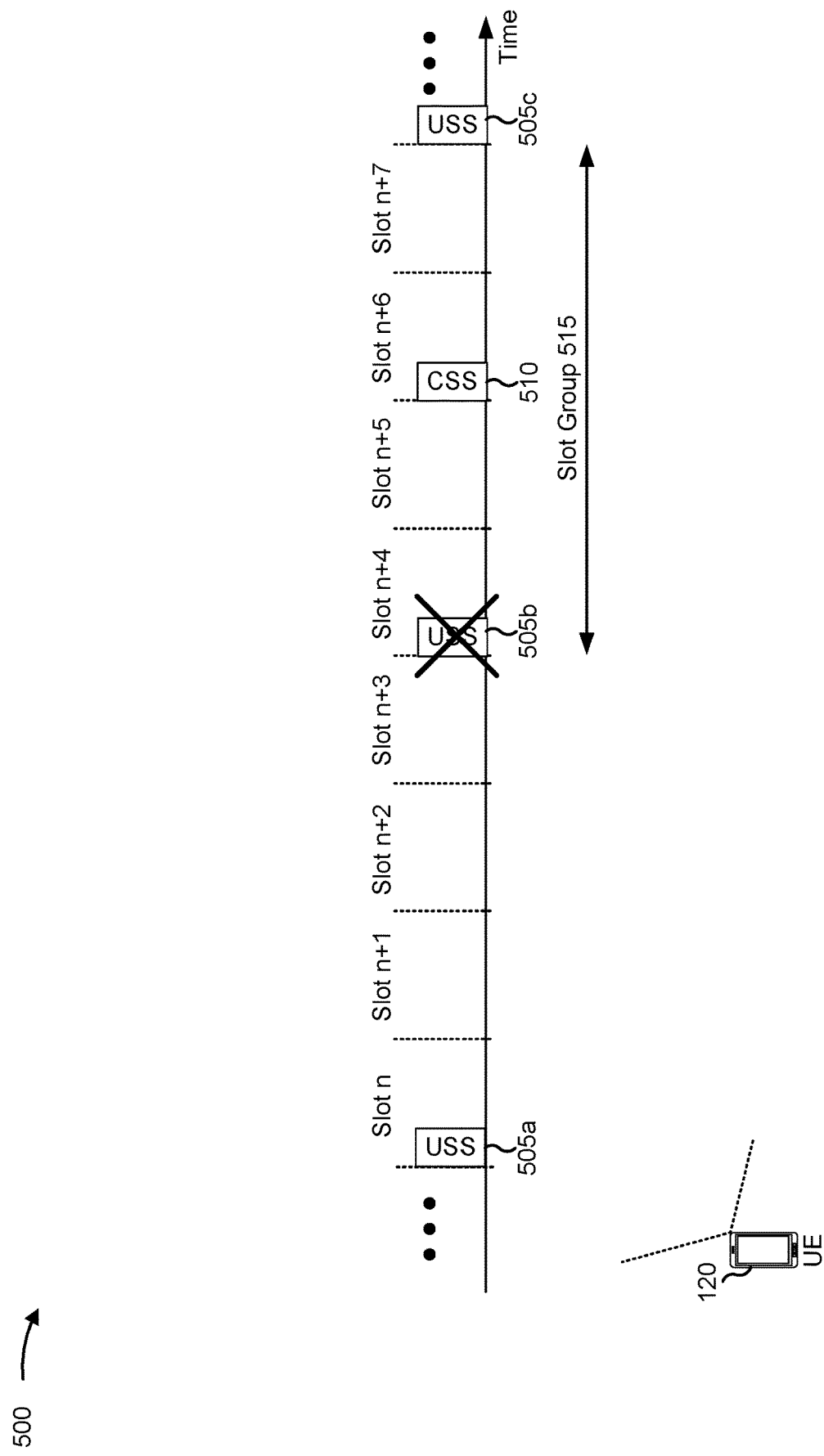
Figure 6:
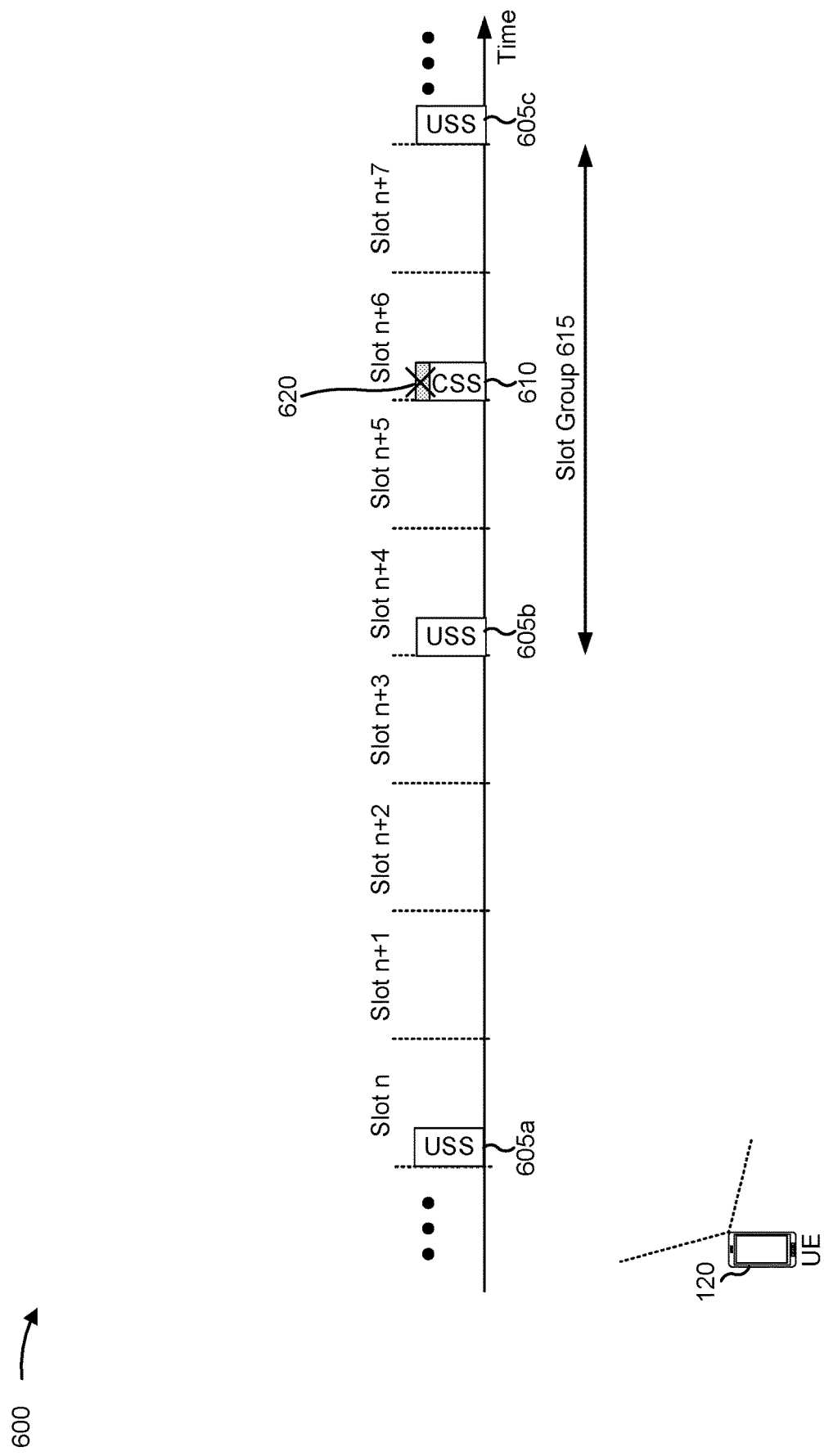
Figure 7:
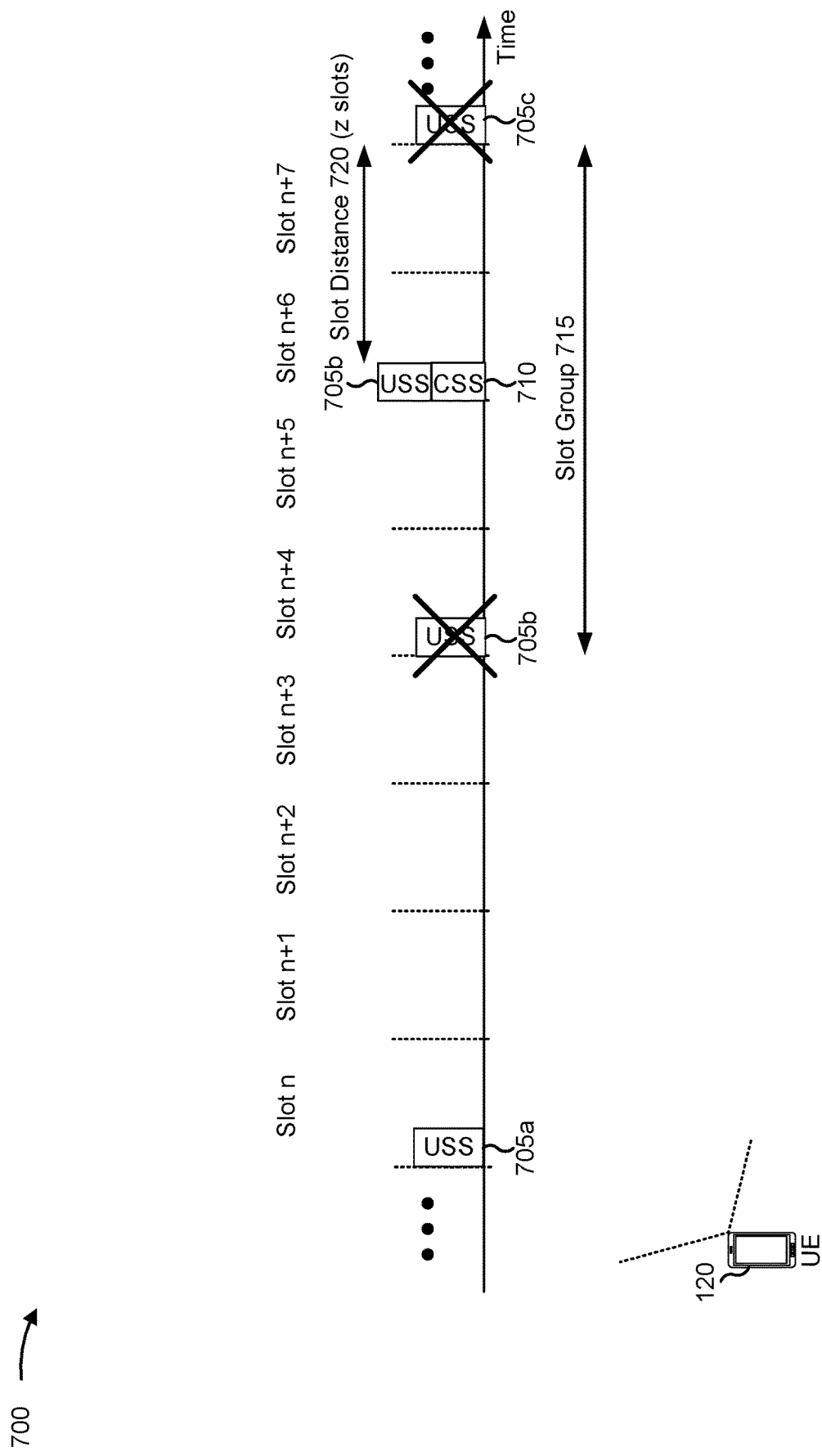

As further shown in FIG. 4, and by reference number 415, the UE 120 may perform USS and CSS monitoring for PDCCH communications from the base station 110 based at least in part on the USS and CSS monitoring configuration. FIGS. 5-7 illustrate examples of the UE 120 performing USS and CSS monitoring for PDCCH communications from the base station 110 based at least in part on the USS and CSS monitoring configuration.

As indicated above, FIG. 4 is provided as an example. Other examples may differ from what is described with regard to FIG. 4.

FIG. 5 is a diagram illustrating an example 500 of configuration of multi-slot PDCCH monitoring, in accordance with the present disclosure. In particular, the example 500 includes an example of a UE 120 refraining from monitoring a USS monitoring occasion that occurs in a same slot group with a CSS monitoring occasion. In some aspects, the UE 120 refrains from monitoring the USS monitoring occasion based at least in part on a USS and CSS monitoring configuration received from a base station 110.

As shown in FIG. 5, the UE 120 is configured to monitor USS monitoring occasions 505 (e.g., 505a-505c) and CSS monitoring occasions 510. As further shown in FIG. 5, a USS monitoring occasion 505b may occur in a slot group 515 along with a CSS monitoring occasion 510.

The UE 120 may determine that the USS monitoring occasion 505b and the CSS monitoring occasion are to occur in the slot group 515 (e.g., the same slot group). The UE 120 may refrain from monitoring the USS monitoring occasion 505b based at least in part on determining that the USS monitoring occasion 505b and the CSS monitoring occasion 510 are to occur in the slot group 515. Since the UE 120 can still monitor a unicast PDCCH portion of the CSS monitoring occasion 510, the impact of not receiving PDCCH communications in the USS monitoring occasion 505b is reduced. Accordingly, the UE 120 may monitor the CSS monitoring occasion 510 in the slot group 515.

As indicated above, FIG. 5 is provided as an example. Other examples may differ from what is described with regard to FIG. 5.

FIG. 6 is a diagram illustrating an example 600 of configuration of multi-slot PDCCH monitoring, in accordance with the present disclosure. In particular, the example 600 includes an example of a UE 120 refraining from monitoring a unicast PDCCH portion of a CSS monitoring occasion that occurs in a same slot group with a USS monitoring occasion. In some aspects, the UE 120 refrains from monitoring a unicast PDCCH portion of a CSS monitoring occasion based at least in part on a USS and CSS monitoring configuration received from a base station 110.

As shown in FIG. 6, the UE 120 is configured to monitor USS monitoring occasions 605 (e.g., 605a-605c) and CSS monitoring occasions 610. As further shown in FIG. 6, a USS monitoring occasion 605b may occur in a slot group 615 along with a CSS monitoring occasion 610.

The UE 120 may determine that the USS monitoring occasion 605b and CSS monitoring occasion 610 are to occur in a slot group 615 (e.g., a same slot group). The UE 120 may refrain from monitoring a unicast PDCCH portion 620 of the CSS monitoring occasion 610 based at least in part on determining that the USS monitoring occasion 605b and the CSS monitoring occasion 610 are to occur in the slot group 615. Since unicast PDCCH can be dedicatedly transmitted on in the USS monitoring occasions 605b to the UE 120 in the slot group 615, impact of not receiving the unicast PDCCH portion 620 in the CSS monitoring occasion 610 is reduced. Accordingly, the UE 120 may monitor the USS monitoring occasion 505b in the slot group 515 for unicast PDCCH.

As indicated above, FIG. 6 is provided as an example. Other examples may differ from what is described with regard to FIG. 6.

FIG. 7 is a diagram illustrating an example 700 of configuration of multi-slot PDCCH monitoring, in accordance with the present disclosure. In particular, the example 700 includes an example of a UE 120 (and an associated base station 110) shifting or modifying the location of USS monitoring occasions for the UE 120 based at least in part on a USS monitoring occasion for the UE 120 and a CSS monitoring occurring in a slot group. In some aspects, the UE 120 shifts or modifies the location of USS monitoring occasions for the UE 120 based at least in part on a USS and CSS monitoring configuration received from a base station 110.

As shown in FIG. 7, the UE 120 is configured to monitor USS monitoring occasions 705 (e.g., 705a-705c) and CSS monitoring occasions 710. As further shown in FIG. 7, a USS monitoring occasion 705b may occur in a slot group 715 along with a CSS monitoring occasion 710.

The UE 120 may determine that a USS monitoring occasion 705b is to occur in a first slot (e.g., Slot n+4) within a slot group 715. The UE 120 may determine that a CSS monitoring occasion 710 is to occur in a second slot (e.g., Slot n+6) within the slot group 715. The UE 120 determine that the first slot and the second slot are different slots. The UE 120 may monitor the USS monitoring occasion 705b in the second slot (e.g., in the same slot as the CSS monitoring occasion 710) based at least in part on determining that the first slot and the second slot are different slots. Similarly, the base station 110 may refrain from transmitting unicast PDCCH communications to the UE 120 in the first slot, and instead may transmit unicast PDCCH communications to the UE 120 in the second slot.

The UE 120 (and the base station 110) may shift or modify the locations of USS monitoring occasions 705 that occur in slot groups 715 long with CSS monitoring occasions 710 in a similar manner. After shifting or modifying the location of a USS monitoring occasion 705 (e.g., the USS monitoring occasion 705*b*), the UE 120 (and the base station 110) may determine whether the USS monitoring occasion and another USS monitoring occasion (e.g., the USS monitoring occasion 705*c*) in a subsequent slot group 715 (or in a previous slot group 715) occur within a slot distance 720 (including z one or more slots) of the modified USS monitoring occasion 705. In particular the UE 120 (and the base station 110) may determine whether a quantity of slots (e.g. the slot distance 720), between the second slot and a third slot in which the other USS monitoring occasion is to occur satisfies a threshold. The UE 120 may refrain from monitoring the other USS monitoring occasion based at least in part on determining that the quantity of slots between the second slot and the third slot does not satisfy the threshold. Similarly, the base station 110 may refrain from transmitting unicast PDCCH communications to the UE 120 in the other USS monitoring occasion based at least in part on determining that the quantity of slots between the second slot and the third slot does not satisfy the threshold. In this way, the UE 120 is enabled to transition to a sleep mode for a sleep duration or a micro-sleep duration, which enables the UE 120 to conserve power resources.

As indicated above, FIG. 7 is provided as an example. Other examples may differ from what is described with regard to FIG. 7.

Figure 8:
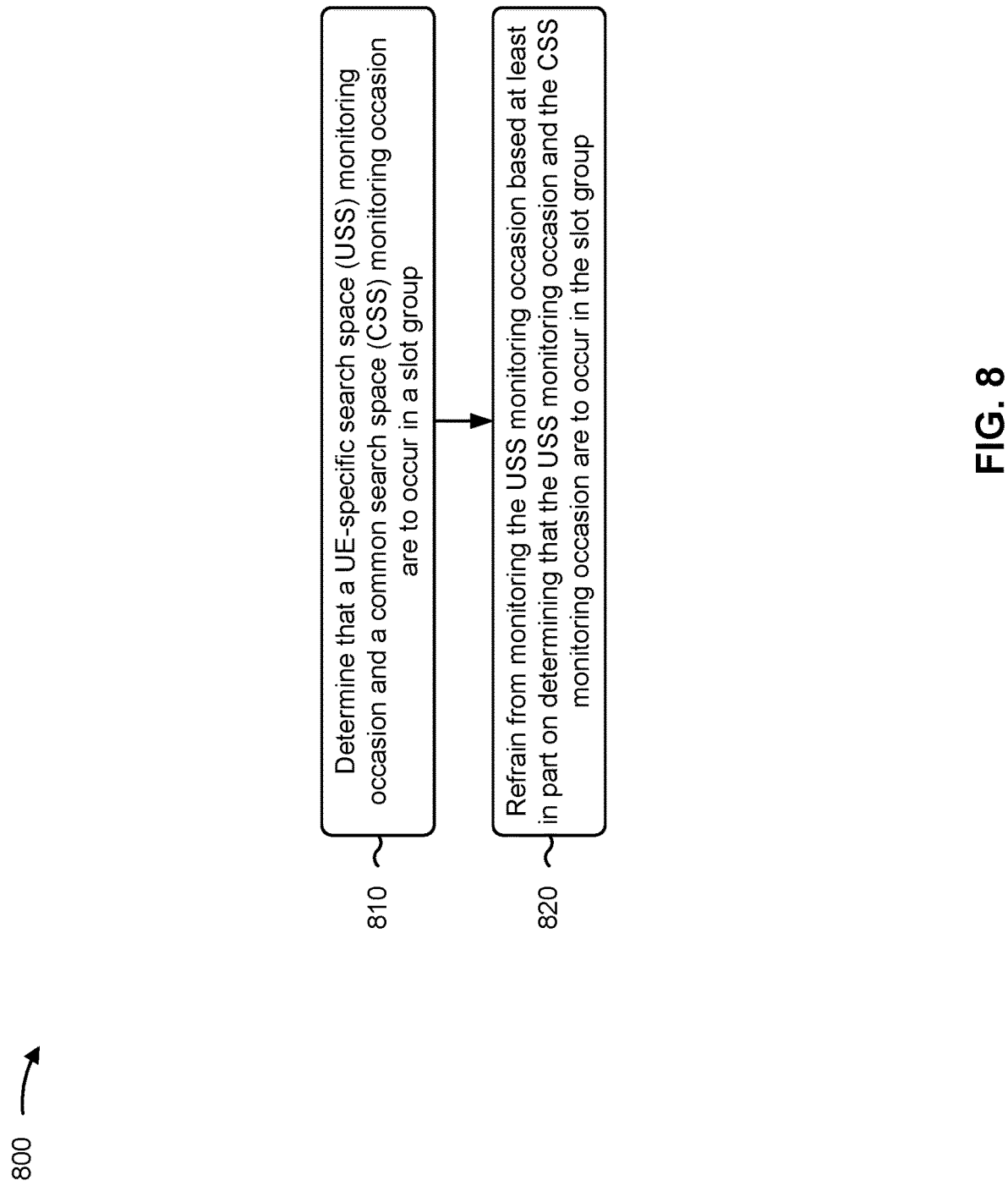
FIGS. 8-10 are diagrams illustrating example processes performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with multi-slot PDCCH monitoring.

As shown in FIG. 8, in some aspects, process 800 may include determining that a USS monitoring occasion and a CSS monitoring occasion are to occur in a slot group (block 810). For example, the UE (e.g., using communication manager 140 and/or determination component 1208, depicted in FIG. 12) may determine that a USS monitoring occasion and a CSS monitoring occasion are to occur in a slot group, as described above.

As further shown in FIG. 8, in some aspects, process 800 may include refraining from monitoring the USS monitoring occasion based at least in part on determining that the USS monitoring occasion and the CSS monitoring occasion are to occur in the slot group (block 820). For example, the UE (e.g., using communication manager 140 and/or monitoring component 1210, depicted in FIG. 12) may refrain from monitoring the USS monitoring occasion based at least in part on determining that the USS monitoring occasion and the CSS monitoring occasion are to occur in the slot group, as described above.

Process 800 may include additional aspects, such as any single aspect or any combination of aspects described below and/or in connection with one or more other processes described elsewhere herein.

In a first aspect, the slot group consists of a plurality of contiguous and non-overlapping slots and the USS monitoring occasion and the CSS monitoring occasion are to occur in different slots in the plurality of contiguous non-overlapping slots.

In a second aspect, alone or in combination with the first aspect, the USS monitoring occasion is included in a slot of a subset of consecutive slots, within the slot group, in which USS monitoring occasions are permitted to be scheduled.

In a third aspect, alone or in combination with one or more of the first and second aspects, process 800 includes monitoring the CSS monitoring occasion for a unicast PDCCH communication.

In a fourth aspect, alone or in combination with one or more of the first through third aspects, process 800 includes transmitting an indication of a UE capability associated with the UE and receiving a USS and CSS monitoring configuration that is based at least in part on the UE capability.

In a fifth aspect, alone or in combination with one or more of the first through fourth aspects, refraining from monitoring the USS monitoring occasion comprises refraining from monitoring the USS monitoring occasion based at least in part on the USS and CSS monitoring configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
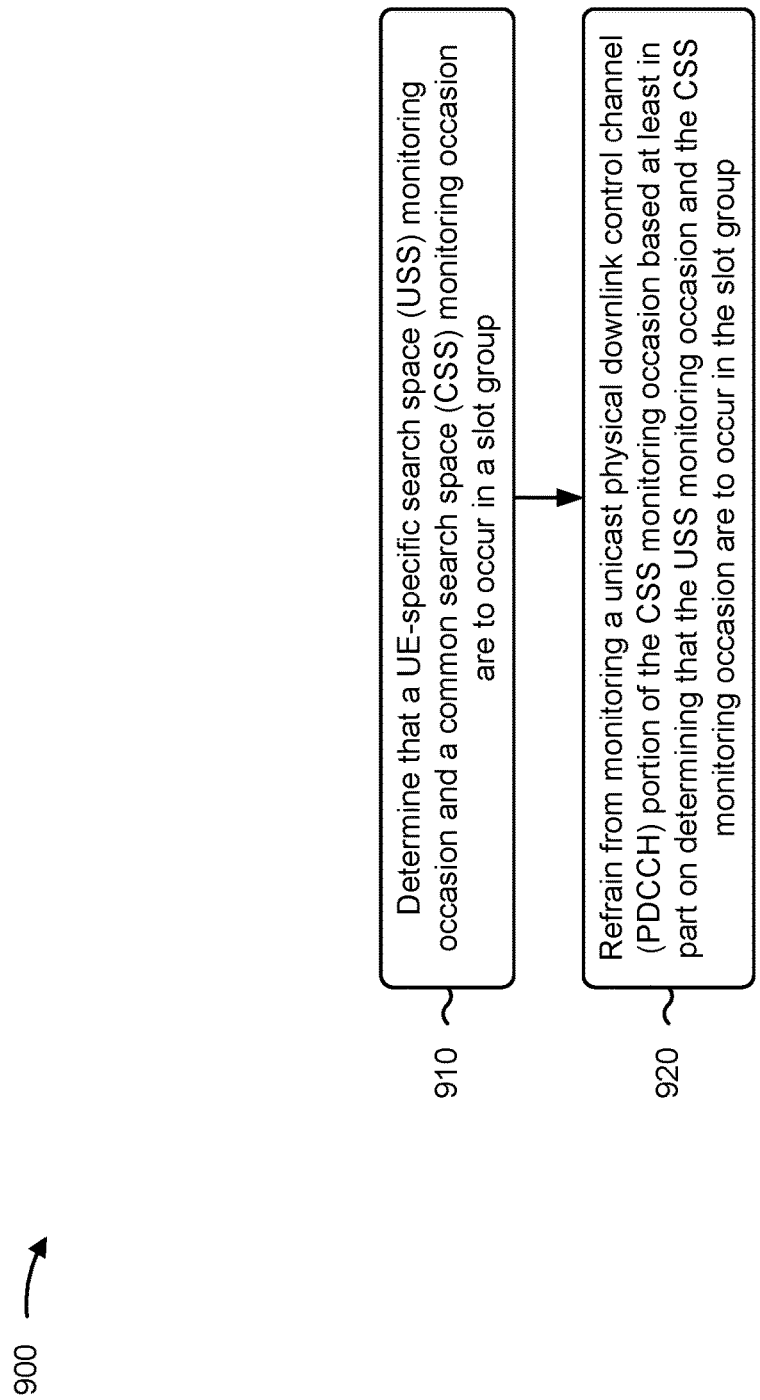

FIG. 9 is a diagram illustrating an example process 900 performed, for example, by a UE, in accordance with the present disclosure. Example process 900 is an example where the UE (e.g., UE 120) performs operations associated with multi-slot PDCCH monitoring.

As shown in FIG. 9, in some aspects, process 900 may include determining that a USS monitoring occasion and a CSS monitoring occasion are to occur in a slot group (block 910). For example, the UE (e.g., using communication manager 140 and/or determination component 1208, depicted in FIG. 12) may determine that USS monitoring occasion and a CSS monitoring occasion are to occur in a slot group, as described above.

As further shown in FIG. 9, in some aspects, process 900 may include refraining from monitoring a unicast PDCCH portion of the CSS monitoring occasion based at least in part on determining that the USS monitoring occasion and the CSS monitoring occasion are to occur in the slot group (block 920). For example, the UE (e.g., using communication manager 140 and/or monitoring component 1210, depicted in FIG. 12) may refrain from monitoring a unicast PDCCH portion of the CSS monitoring occasion based at least in part on determining that the USS monitoring occasion and the CSS monitoring occasion are to occur in the slot group, as described above.

Process 900 may include additional aspects, such as any single aspect or any combination of aspects described below and/or in connection with one or more other processes described elsewhere herein.

In a first aspect, the slot group consists of a plurality of contiguous and non-overlapping slots and the USS monitoring occasion and the CSS monitoring occasion are to occur in different slots in the plurality of contiguous non-overlapping slots.

In a second aspect, alone or in combination with the first aspect, process 900 includes monitoring the USS monitoring occasion in the slot group.

In a third aspect, alone or in combination with one or more of the first and second aspects, process 900 includes transmitting an indication of a UE capability associated with the UE, and receiving a USS and CSS monitoring configuration that is based at least in part on the UE capability.

In a fourth aspect, alone or in combination with one or more of the first through third aspects, refraining from monitoring the unicast PDCCH portion of the CSS monitoring occasion comprises refraining from monitoring the unicast PDCCH portion of the CSS monitoring occasion based at least in part on the USS and CSS monitoring configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
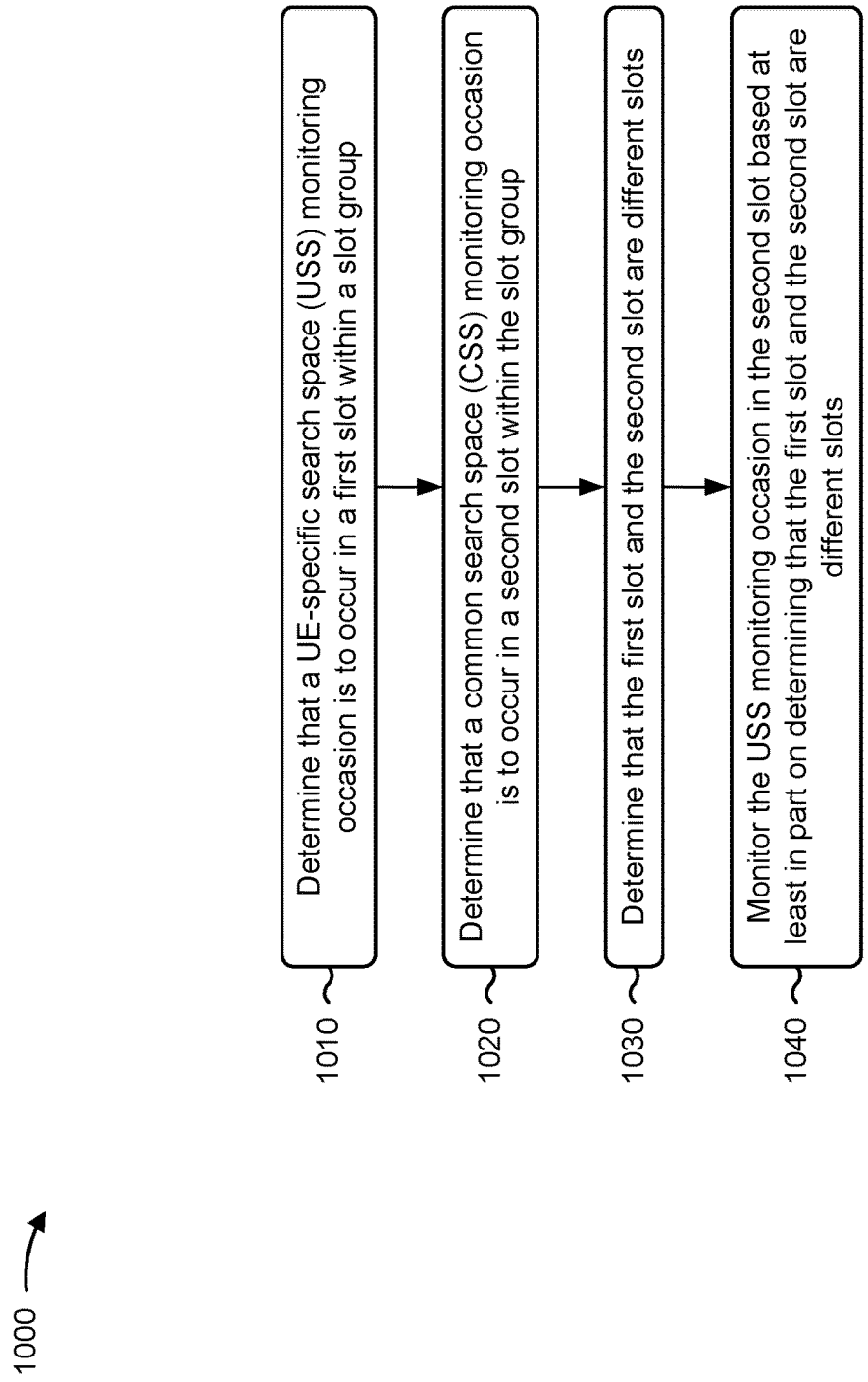

FIG. 10 is a diagram illustrating an example process 1000 performed, for example, by a UE, in accordance with the present disclosure. Example process 1000 is an example where the UE (e.g., UE 120) performs operations associated with multi-slot PDCCH monitoring.

As shown in FIG. 10, in some aspects, process 1000 may include determining that a USS monitoring occasion is to occur in a first slot within a slot group (block 1010). For example, the UE (e.g., using communication manager 140 and/or determination component 1208, depicted in FIG. 12) may determine that a USS monitoring occasion is to occur in a first slot within a slot group, as described above.

As further shown in FIG. 10, in some aspects, process 1000 may include determining that a CSS monitoring occasion is to occur in a second slot within the slot group (block 1020). For example, the UE (e.g., using communication manager 140 and/or determination component 1208, depicted in FIG. 12) may determine that a CSS monitoring occasion is to occur in a second slot within the slot group, as described above.

As further shown in FIG. 10, in some aspects, process 1000 may include determining that the first slot and the second slot are different slots (block 1030). For example, the UE (e.g., using communication manager 140 and/or determination component 1208, depicted in FIG. 12) may determine that the first slot and the second slot are different slots, as described above.

As further shown in FIG. 10, in some aspects, process 1000 may include monitoring the USS monitoring occasion in the second slot based at least in part on determining that the first slot and the second slot are different slots (block 1040). For example, the UE (e.g., using communication manager 140 and/or monitoring component 1210, depicted in FIG. 12) may monitor the USS monitoring occasion in the second slot based at least in part on determining that the first slot and the second slot are different slots, as described above.

Process 1000 may include additional aspects, such as any single aspect or any combination of aspects described below and/or in connection with one or more other processes described elsewhere herein.

In a first aspect, the slot group consists of a plurality of contiguous and non-overlapping slots.

In a second aspect, alone or in combination with the first aspect, process 1000 includes determining that a quantity of slots, between the second slot and a third slot in which another USS monitoring occasion is to occur in another slot group, does not satisfy a threshold, and refraining from monitoring the other USS monitoring occasion based at least in part on determining that the quantity of slots between the second slot and the third slot does not satisfy the threshold.

In a third aspect, alone or in combination with one or more of the first and second aspects, process 1000 includes transmitting an indication of a UE capability associated with the UE and receiving a USS and CSS monitoring configuration that is based at least in part on the UE capability.

In a fourth aspect, alone or in combination with one or more of the first through third aspects, refraining from monitoring the unicast PDCCH portion of the CSS monitoring occasion comprises monitoring the USS monitoring occasion in the second slot based at least in part on the USS and CSS monitoring configuration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
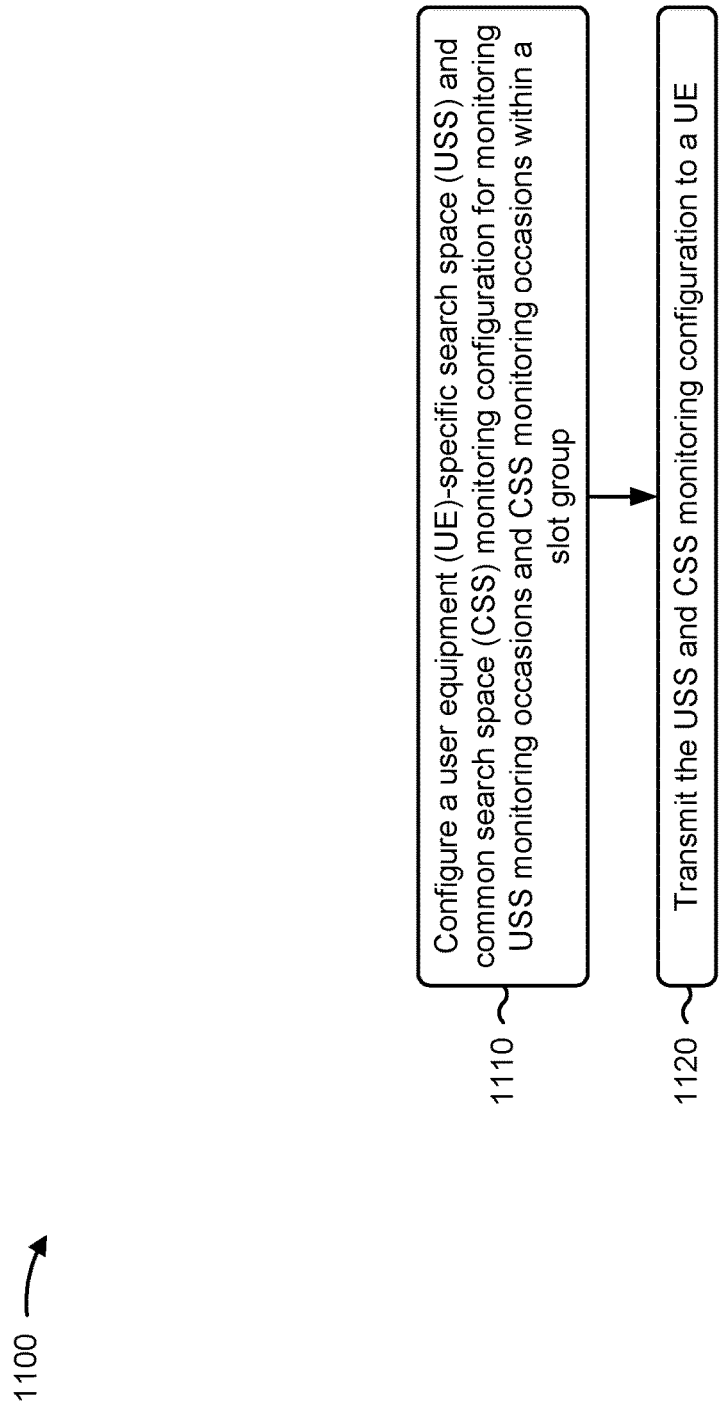
FIG. 11 is a diagram illustrating an example process performed, for example, by a base station, in accordance with the present disclosure.

FIG. 11 is a diagram illustrating an example process 1100 performed, for example, by a base station, in accordance with the present disclosure. Example process 1100 is an example where the base station (e.g., base station 110) performs operations associated with multi-slot PDCCH monitoring.

As shown in FIG. 11, in some aspects, process 1100 may include configuring a USS and CSS monitoring configuration for monitoring USS monitoring occasions and CSS monitoring occasions within a slot group (block 1110). For example, the base station (e.g., using communication manager 150 and/or configuration component 1308, depicted in FIG. 13) may configure a USS and CSS monitoring configuration for monitoring USS monitoring occasions and CSS monitoring occasions within a slot group, as described above.

As further shown in FIG. 11, in some aspects, process 1100 may include transmitting the USS and CSS monitoring configuration to a UE (block 1120). For example, the base station (e.g., using communication manager 150 and/or transmission component 1304, depicted in FIG. 13) may transmit the USS and CSS monitoring configuration to a UE, as described above.

Process 1100 may include additional aspects, such as any single aspect or any combination of aspects described below and/or in connection with one or more other processes described elsewhere herein.

In a first aspect, the USS and CSS monitoring configuration indicates that the UE is to refrain from monitoring a USS monitoring occasion based at least in part on the USS monitoring occasion and a CSS monitoring occasion occurring in the slot group.

In a second aspect, alone or in combination with the first aspect, the USS and CSS monitoring configuration indicates that the UE is to refrain from monitoring a unicast PDCCH portion of a CSS monitoring occasion based at least in part on a USS monitoring occasion and the CSS monitoring occasion occurring in the slot group.

In a third aspect, alone or in combination with one or more of the first and second aspects, the USS and CSS monitoring configuration indicates that, based at least in part on a USS monitoring occasion and the CSS monitoring occasion occurring in different slots within the slot group, the UE is to refraining from monitoring the USS monitoring occasion in a first slot within the slot group, and monitoring the USS monitoring occasion in a second slot, within the slot group, in which the CSS monitoring occasion is to occur.

In a fourth aspect, alone or in combination with one or more of the first through third aspects, configuring the USS and CSS monitoring configuration comprises configuring the USS and CSS monitoring configuration based at least in part on a UE capability associated with the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
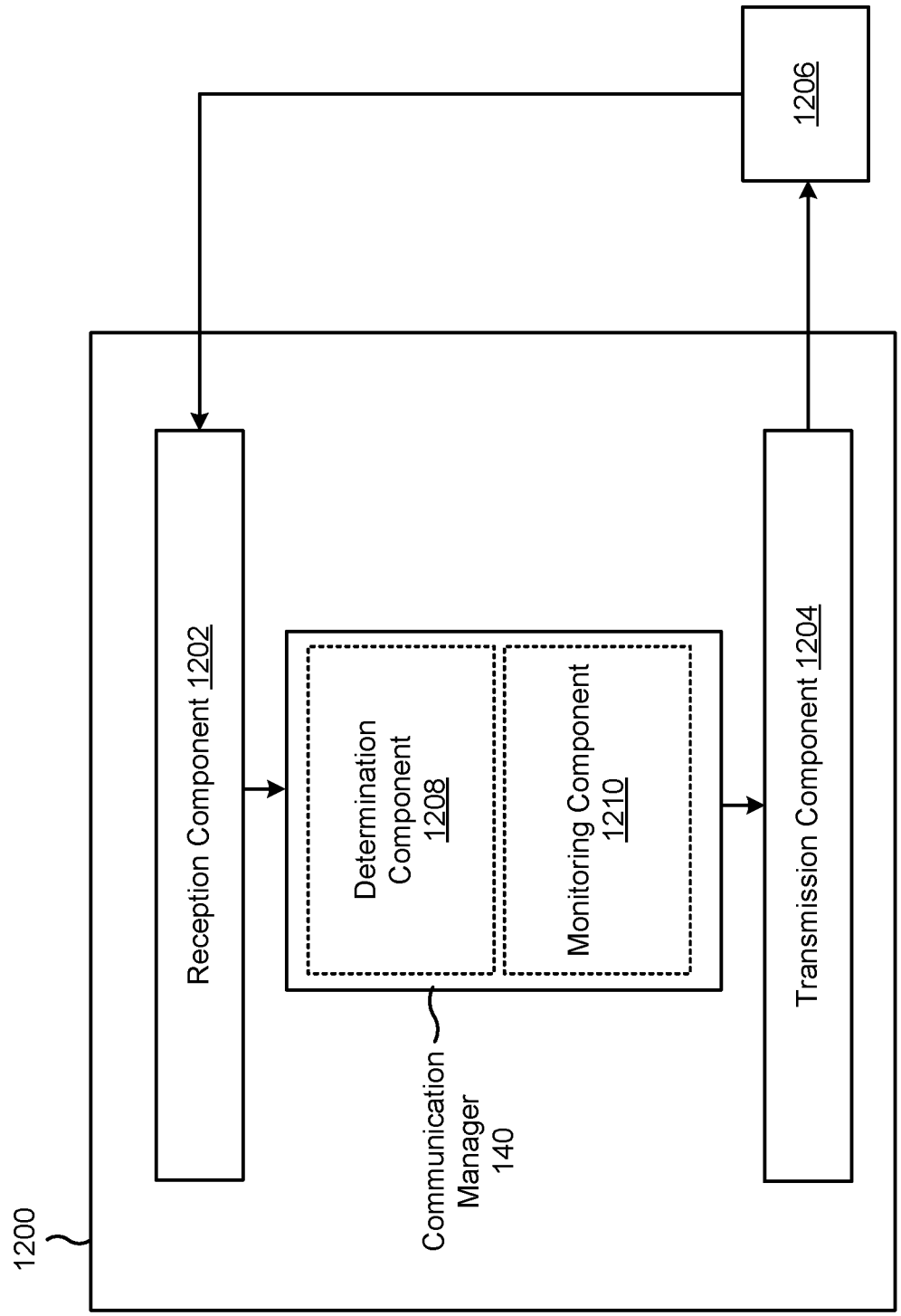
FIGS. 12 and 13 are diagrams of example apparatuses for wireless communication, in accordance with the present disclosure.

FIG. 12 is a diagram of an example apparatus 1200 for wireless communication. The apparatus 1200 may be a UE 120, or a UE 120 may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a determination component 1208 and/or a monitoring component 1210, among other examples.

In some aspects, the apparatus 1200 may be configured to perform one or more operations described herein in connection with FIGS. 3A-7. Additionally, or alternatively, the apparatus 1200 may be configured to perform one or more processes described herein, such as process 800 of FIG. 8, process 900 of FIG. 9, process 1000 of FIG. 10, or a combination thereof. In some aspects, the apparatus 1200 and/or one or more components shown in FIG. 12 may include one or more components of the UE 120 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE 120 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE 120 described in connection with FIG. 2. In some aspects, the transmission component 1204 may be co-located with the reception component 1202 in a transceiver.

In some aspects, the determination component 1208 may determine that a USS monitoring occasion and a CSS monitoring occasion are to occur in a slot group. The monitoring component 1210 may refrain from monitoring the USS monitoring occasion based at least in part on a determination of the determination component 1208 that the USS monitoring occasion and the CSS monitoring occasion are to occur in the slot group. In some aspects, the monitoring component 1210 may monitor the CSS monitoring occasion for a unicast PDCCH communication. In some aspects, the transmission component 1204 may transmit (e.g., to the apparatus 1206) an indication of a UE capability associated with the apparatus 1200. In some aspects, the reception component 1202 may receive (e.g., from the apparatus 1206) a USS and CSS monitoring configuration that is based at least in part on the UE capability.

In some aspects, the determination component 1208 may determine that a USS monitoring occasion and a CSS monitoring occasion are to occur in a slot group. The monitoring component 1210 may refrain from monitoring a unicast PDCCH portion of the CSS monitoring occasion based at least in part on a determination by the determination component 1208 that the USS monitoring occasion and the CSS monitoring occasion are to occur in the slot group. In some aspects, the monitoring component 1210 may monitor the USS monitoring occasion in the slot group.

In some aspects, the determination component 1208 may determine that a USS monitoring occasion is to occur in a first slot within a slot group. The determination component 1208 may determine that a CSS monitoring occasion is to occur in a second slot within the slot group. The determination component 1208 may determine that the first slot and the second slot are different slots. The monitoring component 1210 may monitor the USS monitoring occasion in the second slot based at least in part on a determination by the determination component 1208 that the first slot and the second slot are different slots. In some aspects, the determination component 1208 may determine that a quantity of slots, between the second slot and a third slot in which another USS monitoring occasion is to occur in another slot group, does not satisfy a threshold. In some aspects, the monitoring component 1210 may refrain from monitoring the other USS monitoring occasion based at least in part on a determination by the determination component 1208 that the quantity of slots between the second slot and the third slot does not satisfy the threshold.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
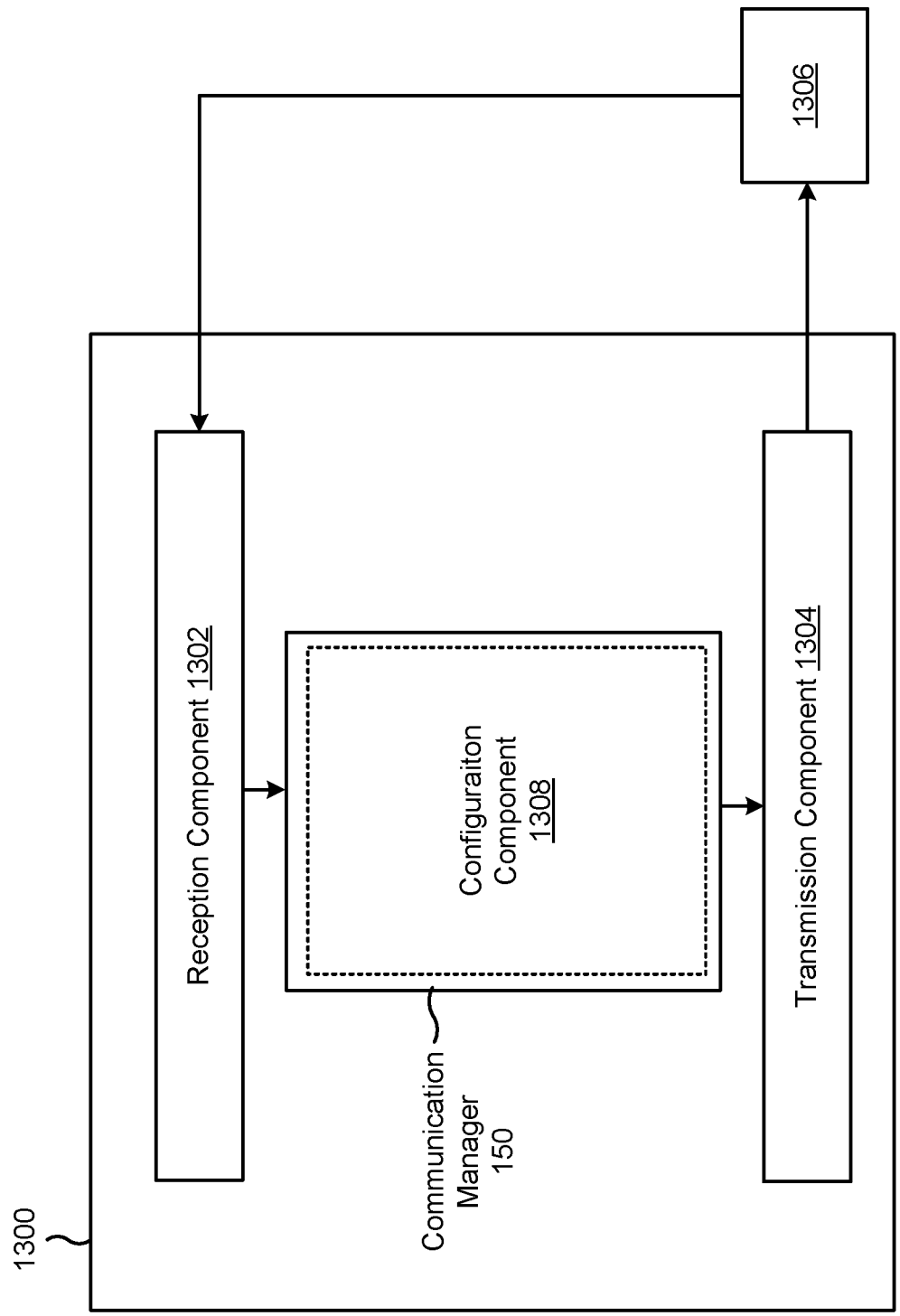

FIG. 13 is a diagram of an example apparatus 1300 for wireless communication. The apparatus 1300 may be a base station 110, or a base station 110 may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a configuration component 1308, among other examples.

In some aspects, the apparatus 1300 may be configured to perform one or more operations described herein in connection with FIGS. 3A-7. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station 110 described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station 110 described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station 110 described in connection with FIG. 2. In some aspects, the transmission component 1304 may be co-located with the reception component 1302 in a transceiver.

The configuration component 1308 may configure a USS and CSS monitoring configuration for monitoring USS monitoring occasions and CSS monitoring occasions within a slot group. The transmission component 1304 may transmit the USS and CSS monitoring configuration to the apparatus 1306.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: determining that a UE-specific search space (USS) monitoring occasion and a common search space (CSS) monitoring occasion are to occur in a slot group; and refraining from monitoring the USS monitoring occasion based at least in part on determining that the USS monitoring occasion and the CSS monitoring occasion are to occur in the slot group.

Aspect 2: The method of Aspect 1, wherein the slot group consists of a plurality of contiguous and non-overlapping slots; and wherein the USS monitoring occasion and the CSS monitoring occasion are to occur in different slots in the plurality of contiguous non-overlapping slots.

Aspect 3: The method of Aspect 1 or 2, wherein the USS monitoring occasion is included in a slot of a subset of consecutive slots, within the slot group, in which USS monitoring occasions are permitted to be scheduled.

Aspect 4: The method of one or more of Aspects 1-3, further comprising: monitoring the CSS monitoring occasion for a unicast physical downlink control channel (PDCCH) communication.

Aspect 5: The method of one or more of Aspects 1-4, further comprising: transmitting an indication of a UE capability associated with the UE; and receiving a USS and CSS monitoring configuration that is based at least in part on the UE capability.

Aspect 6: The method of Aspect 5, wherein refraining from monitoring the USS monitoring occasion comprises: refraining from monitoring the USS monitoring occasion based at least in part on the USS and CSS monitoring configuration.

Aspect 7: A method of wireless communication performed by a user equipment (UE), comprising: determining that a UE-specific search space (USS) monitoring occasion and a common search space (CSS) monitoring occasion are to occur in a slot group; and refraining from monitoring a unicast physical downlink control channel (PDCCH) portion of the CSS monitoring occasion based at least in part on determining that the USS monitoring occasion and the CSS monitoring occasion are to occur in the slot group.

Aspect 8: The method of Aspect 7, wherein the slot group consists of a plurality of contiguous and non-overlapping slots; and wherein the USS monitoring occasion and the CSS monitoring occasion are to occur in different slots in the plurality of contiguous non-overlapping slots.

Aspect 9: The method of Aspect 7 or 8, further comprising: monitoring the USS monitoring occasion in the slot group.

Aspect 10: The method of one or more of Aspects 7-9, further comprising: transmitting an indication of a UE capability associated with the UE; and receiving a USS and CSS monitoring configuration that is based at least in part on the UE capability.

Aspect 11: The method of one or more of Aspects 7-10, wherein refraining from monitoring the unicast PDCCH portion of the CSS monitoring occasion comprises: refraining from monitoring the unicast PDCCH portion of the CSS monitoring occasion based at least in part on the USS and CSS monitoring configuration.

Aspect 12: A method of wireless communication performed by a user equipment (UE), comprising: determining that a UE-specific search space (USS) monitoring occasion is to occur in a first slot within a slot group; determining that a common search space (CSS) monitoring occasion is to occur in a second slot within the slot group; determining that the first slot and the second slot are different slots; and monitoring the USS monitoring occasion in the second slot based at least in part on determining that the first slot and the second slot are different slots.

Aspect 13: The method of Aspect 12, wherein the slot group consists of a plurality of contiguous and non-overlapping slots.

Aspect 14: The method of Aspect 12 or 13, further comprising: determining that a quantity of slots, between the second slot and a third slot in which another USS monitoring occasion is to occur in another slot group, does not satisfy a threshold; and refraining from monitoring the other USS monitoring occasion based at least in part on determining that the quantity of slots between the second slot and the third slot does not satisfy the threshold.

Aspect 15: The method of one or more of Aspects 12-14, further comprising: transmitting an indication of a UE capability associated with the UE; and receiving a USS and CSS monitoring configuration that is based at least in part on the UE capability.

Aspect 16: The method of one or more of Aspects 12-15, wherein refraining from monitoring the unicast PDCCH portion of the CSS monitoring occasion comprises: monitoring the USS monitoring occasion in the second slot based at least in part on the USS and CSS monitoring configuration.

Aspect 17: A method of wireless communication performed by a base station, comprising: configuring a user equipment (UE)-specific search space (USS) and common search space (CSS) monitoring configuration for monitoring USS monitoring occasions and CSS monitoring occasions within a slot group; and transmitting the USS and CSS monitoring configuration to a UE.

Aspect 18: The method of Aspect 17, wherein the USS and CSS monitoring configuration indicates that the UE is to refrain from monitoring a USS monitoring occasion based at least in part on the USS monitoring occasion and a CSS monitoring occasion occurring in the slot group.

Aspect 19: The method of Aspect 17 or 18, wherein the USS and CSS monitoring configuration indicates that the UE is to refrain from monitoring a unicast physical downlink control channel (PDCCH) portion of a CSS monitoring occasion based at least in part on a USS monitoring occasion and the CSS monitoring occasion occurring in the slot group.

Aspect 20: The method of one or more of Aspects 17-19, wherein the USS and CSS monitoring configuration indicates that, based at least in part on a USS monitoring occasion and the CSS monitoring occasion occurring in different slots within the slot group, the UE is to: refrain from monitoring the USS monitoring occasion in a first slot within the slot group; and monitor the USS monitoring occasion in a second slot, within the slot group, in which the CSS monitoring occasion is to occur.

Aspect 21: The method of one or more of Aspects 17-20, wherein configuring the USS and CSS monitoring configuration comprises: configuring the USS and CSS monitoring configuration based at least in part on a UE capability associated with the UE.

Aspect 22: An apparatus for wireless communication at a device, comprising a processor; memory coupled with the processor; and instructions stored in the memory and executable by the processor to cause the apparatus to perform the method of one or more of Aspects 1-6.

Aspect 23: A device for wireless communication, comprising a memory and one or more processors coupled to the memory, the one or more processors configured to perform the method of one or more of Aspects 1-6.

Aspect 24: An apparatus for wireless communication, comprising at least one means for performing the method of one or more of Aspects 1-6.

Aspect 25: A non-transitory computer-readable medium storing code for wireless communication, the code comprising instructions executable by a processor to perform the method of one or more of Aspects 1-6.

Aspect 26: A non-transitory computer-readable medium storing a set of instructions for wireless communication, the set of instructions comprising one or more instructions that, when executed by one or more processors of a device, cause the device to perform the method of one or more of Aspects 1-6.

Aspect 27: An apparatus for wireless communication at a device, comprising a processor; memory coupled with the processor; and instructions stored in the memory and executable by the processor to cause the apparatus to perform the method of one or more of Aspects 7-11.

Aspect 28: A device for wireless communication, comprising a memory and one or more processors coupled to the memory, the one or more processors configured to perform the method of one or more of Aspects 7-11.

Aspect 29: An apparatus for wireless communication, comprising at least one means for performing the method of one or more of Aspects 7-11.

Aspect 30: A non-transitory computer-readable medium storing code for wireless communication, the code comprising instructions executable by a processor to perform the method of one or more of Aspects 7-11.

Aspect 31: A non-transitory computer-readable medium storing a set of instructions for wireless communication, the set of instructions comprising one or more instructions that, when executed by one or more processors of a device, cause the device to perform the method of one or more of Aspects 7-11.

Aspect 32: An apparatus for wireless communication at a device, comprising a processor; memory coupled with the processor; and instructions stored in the memory and executable by the processor to cause the apparatus to perform the method of one or more of Aspects 12-16.

Aspect 33: A device for wireless communication, comprising a memory and one or more processors coupled to the memory, the one or more processors configured to perform the method of one or more of Aspects 12-16.

Aspect 34: An apparatus for wireless communication, comprising at least one means for performing the method of one or more of Aspects 12-16.

Aspect 35: A non-transitory computer-readable medium storing code for wireless communication, the code comprising instructions executable by a processor to perform the method of one or more of Aspects 12-16.

Aspect 36: A non-transitory computer-readable medium storing a set of instructions for wireless communication, the set of instructions comprising one or more instructions that, when executed by one or more processors of a device, cause the device to perform the method of one or more of Aspects 12-16.

Aspect 37: An apparatus for wireless communication at a device, comprising a processor; memory coupled with the processor; and instructions stored in the memory and executable by the processor to cause the apparatus to perform the method of one or more of Aspects 17-21.

Aspect 38: A device for wireless communication, comprising a memory and one or more processors coupled to the memory, the one or more processors configured to perform the method of one or more of Aspects 17-21.

Aspect 39: An apparatus for wireless communication, comprising at least one means for performing the method of one or more of Aspects 17-21.

Aspect 40: A non-transitory computer-readable medium storing code for wireless communication, the code comprising instructions executable by a processor to perform the method of one or more of Aspects 17-21.

Aspect 41: A non-transitory computer-readable medium storing a set of instructions for wireless communication, the set of instructions comprising one or more instructions that, when executed by one or more processors of a device, cause the device to perform the method of one or more of Aspects 17-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      determine that a UE-specific search space (USS) monitoring occasion and a common search space (CSS) monitoring occasion are to occur in a slot group, wherein the slot group consists of a plurality of contiguous and non-overlapping slots, and wherein the USS monitoring occasion and the CSS monitoring occasion are to occur in different slots in the plurality of contiguous and non-overlapping slots; and
      refrain from monitoring the USS monitoring occasion based at least in part on determining that the USS monitoring occasion and the CSS monitoring occasion are to occur in the slot group.

2. The UE of claim 1, wherein the USS monitoring occasion is included in a slot of a subset of consecutive slots, within the slot group, in which USS monitoring occasions are permitted to be scheduled.

3. The UE of claim 1, wherein the one or more processors are further configured to:
monitor the CSS monitoring occasion for a unicast physical downlink control channel (PDCCH) communication.

4. The UE of claim 1, wherein the one or more processors are further configured to:
transmit an indication of a UE capability associated with the UE; and
receive a USS and CSS monitoring configuration that is based at least in part on the UE capability.

5. The UE of claim 4, wherein the one or more processors, to refrain from monitoring the USS monitoring occasion, are configured to:
refrain from monitoring the USS monitoring occasion based at least in part on the USS and CSS monitoring configuration.

6. A user equipment (UE) for wireless communication, comprising:
a memory; and
one or more processors, coupled to the memory, configured to:
determine that a UE-specific search space (USS) monitoring occasion and a common search space (CSS) monitoring occasion are to occur in a slot group, wherein the slot group consists of a plurality of contiguous and non-overlapping slots, and wherein the USS monitoring occasion and the CSS monitoring occasion are to occur in different slots in the plurality of contiguous and non-overlapping slots; and
refrain from monitoring a unicast physical downlink control channel (PDCCH) portion of the CSS monitoring occasion based at least in part on determining that the USS monitoring occasion and the CSS monitoring occasion are to occur in the slot group.

7. The UE of claim 6, wherein the one or more processors are further configured to:
monitor the USS monitoring occasion in the slot group.

8. The UE of claim 6, wherein the one or more processors are further configured to:
transmit an indication of a UE capability associated with the UE; and
receive a USS and CSS monitoring configuration that is based at least in part on the UE capability.

9. The UE of claim 8, wherein the one or more processors, to refrain from monitoring the unicast PDCCH portion of the CSS monitoring occasion, are configured to:
refrain from monitoring the unicast PDCCH portion of the CSS monitoring occasion based at least in part on the USS and CSS monitoring configuration.

10. A user equipment (UE) for wireless communication, comprising:
a memory; and
one or more processors, coupled to the memory, configured to:
determine that a UE-specific search space (USS) monitoring occasion is to occur in a first slot within a slot group;
determine that a common search space (CSS) monitoring occasion is to occur in a second slot within the slot group;
determine that the first slot and the second slot are different slots, wherein the slot group consists of a plurality of contiguous and non-overlapping slots, and wherein the USS monitoring occasion and the CSS monitoring occasion are to occur in the different slots, the different slots in the plurality of contiguous and non-overlapping slots; and
monitor the USS monitoring occasion in the second slot based at least in part on determining that the first slot and the second slot are the different slots.

11. The UE of claim 10, wherein the one or more processors are further configured to:
determine that a quantity of slots, between the second slot and a third slot in which another USS monitoring occasion is to occur in another slot group, does not satisfy a threshold; and
refrain from monitoring the other USS monitoring occasion based at least in part on determining that the quantity of slots between the second slot and the third slot does not satisfy the threshold.

12. The UE of claim 10, wherein the one or more processors are further configured to:
transmit an indication of a UE capability associated with the UE; and
receive a USS and CSS monitoring configuration that is based at least in part on the UE capability.

13. The UE of claim 12, wherein the one or more processors, to monitor the USS monitoring occasion, are configured to:
monitor the USS monitoring occasion in the second slot based at least in part on the USS and CSS monitoring configuration.

14. A network entity for wireless communication, comprising:
a memory; and
one or more processors, coupled to the memory, configured to:
configure a user equipment (UE)-specific search space (USS) and common search space (CSS) monitoring configuration for monitoring a USS monitoring occasion and a CSS monitoring occasion within a slot group, wherein the slot group consists of a plurality of contiguous and non-overlapping slots, and wherein the USS monitoring occasion and the CSS monitoring occasion are to occur in different slots in the plurality of contiguous and non-overlapping slots; and
transmit the USS and CSS monitoring configuration to a UE.

15. The network entity of claim 14, wherein the USS and CSS monitoring configuration indicates that the UE is to refrain from monitoring the USS monitoring occasion based at least in part on the USS monitoring occasion and the CSS monitoring occasion occurring in the slot group.

16. The network entity of claim 14, wherein the USS and CSS monitoring configuration indicates that the UE is to refrain from monitoring a unicast physical downlink control channel (PDCCH) portion of the CSS monitoring occasion based at least in part on the USS monitoring occasion and the CSS monitoring occasion occurring in the slot group.

17. The network entity of claim 14, wherein the USS and CSS monitoring configuration indicates that, based at least in part on the USS monitoring occasion and the CSS monitoring occasion occurring in the different slots, the UE is to:
refrain from monitoring the USS monitoring occasion in a first slot within the slot group; and
monitor the USS monitoring occasion in a second slot, within the slot group, in which the CSS monitoring occasion is to occur.

18. The network entity of claim 14, wherein the one or more processors, to configure the USS and CSS monitoring configuration, are configured to:
    configure the USS and CSS monitoring configuration based at least in part on a UE capability associated with the UE.

19. The UE of claim 6, wherein the USS monitoring occasion is included in a slot of a subset of consecutive slots, within the slot group, in which USS monitoring occasions are permitted to be scheduled.

20. The UE of claim 8, wherein the one or more processors, to refrain from monitoring the USS monitoring occasion, are configured to:
    refrain from monitoring the USS monitoring occasion based at least in part on the USS and CSS monitoring configuration.

21. The UE of claim 10, wherein the USS monitoring occasion is included in a slot of a subset of consecutive slots, within the slot group, in which USS monitoring occasions are permitted to be scheduled.

\* \* \* \* \*